United States Patent [19]

Worthington et al.

[11] Patent Number: 5,698,834

[45] Date of Patent: *Dec. 16, 1997

[54] VOICE PROMPT WITH VOICE RECOGNITION FOR PORTABLE DATA COLLECTION TERMINAL

[75] Inventors: Hall V. Worthington; Montgomery W. Worthington, both of Santa Cruz; Steven A. Luzovich, Ben Lomond, all of Calif.

[73] Assignee: Worthington Data Solutions, Santa Cruz, Calif.

[*] Notice: The term of this patent shall not extend beyond the expiration date of Pat. No. 5,365,050.

[21] Appl. No.: 486,030

[22] Filed: Jun. 7, 1995

Related U.S. Application Data

[63] Continuation-in-part of Ser. No. 149,881, Nov. 10, 1993, Pat. No. 5,510,606, which is a continuation-in-part of Ser. No. 32,039, Mar. 16, 1993, Pat. No. 5,365,050.

[51] Int. Cl.⁶ .................................................. G06K 7/10
[52] U.S. Cl. ........................................ 235/472; 235/462
[58] Field of Search ................................... 235/462, 472

[56] References Cited

U.S. PATENT DOCUMENTS

| | | | |
|---|---|---|---|
| 4,418,277 | 11/1983 | Tremmel et al. | 235/472 |
| 4,509,129 | 4/1985 | Yatsunami et al. | 364/513.5 |
| 4,782,513 | 11/1988 | Krueger | 379/110 |
| 4,870,687 | 9/1989 | DeLeon | 381/51 |
| 5,056,145 | 10/1991 | Yamamoto et al. | 381/51 |
| 5,126,543 | 6/1992 | Bergeron et al. | 235/462 |
| 5,208,449 | 5/1993 | Eastman et al. | 235/462 |
| 5,243,149 | 9/1993 | Comerford et al. | 178/18 |
| 5,288,976 | 2/1994 | Citron et al. | 235/375 |
| 5,331,136 | 7/1994 | Koenck et al. | 235/375 |
| 5,410,141 | 4/1995 | Koenck et al. | 235/472 |

FOREIGN PATENT DOCUMENTS

| | | |
|---|---|---|
| 2657991 | 8/1991 | France . |
| 2249084 | 11/1990 | Japan . |

OTHER PUBLICATIONS

"Bar Code Reader with Voice Output", IBM Technical Disclosure Bulletin, vol. 30, No. 4, Sep. 1987, p. 1515, (no author).

*Primary Examiner*—Donald T. Hajec
*Assistant Examiner*—Mark Tremblay
*Attorney, Agent, or Firm*—Skjerven, Morrill, MacPherson, Franklin & Friel, LLP; Forrest E. Gunnison

[57] ABSTRACT

A portable data collection system includes a portable data collection terminal with a voice prompt circuit, a voice recognition circuit and optionally a bar code scanning device, such as a wand. The portable data collection terminal is similar in size and performs the same data collection functions as prior art portable data collection terminals but adds voice prompts for improved functionality, flexibility, and ease of use. When data is entered from either a keypad, or a bar code scanner, or when the operator needs to be prompted to take a particular action, a voice prompt circuit is activated to provide an oral message to the operator. The operator can respond with an oral phrase that is processed by the voice recognition circuit.

18 Claims, 14 Drawing Sheets

VOICE PROMPT WITH VOICE RECOGNITION FOR PORTABLE DATA COLLECTION TERMINAL

RELATED APPLICATIONS

This application is a continuation-in-part of U.S. patent application Ser. No. 08/149,881 entitled "VOICE PROMPT FOR PORTABLE DATA COLLECTION TERMINAL," of Hall V. Worthington et al., filed on Nov. 10, 1993 U.S. Pat. No. 5,510,606 which was a continuation-in-part of U.S. patent application Ser. No. 08/032,039 entitled "A PORTABLE DATA COLLECTION TERMINAL WITH VOICE PROMPT AND RECORDING," of Hall V. Worthington et al. filed on Mar. 16, 1993, now U.S. Pat. No. 5,365,050 which issued on Nov. 15, 1994.

BACKGROUND OF THE INVENTION

1. Field of the Invention

The present invention relates in general to enunciators for portable data collection terminals, and in particular to a voice prompt system with voice recognition for a portable data collection terminal.

2. Description of Related Art

A data collection terminal 100 typically has an enclosure 101 housing a display 103, such as a liquid crystal display (LCD) 103, a keypad 102 for entering data, and an enunciator 108 for audible feedback. Optionally, a bar code scanning device, such as a wand 104, may be connected to or integral in data collection terminal 100 for entering bar code data 106. Data collection terminal 100 is typically battery powered using one or more battery cells. To conserve battery power, wand 104 may be pulsed or contain a switch 105 that turns on wand 104 and terminal 100 only while switch 105 is activated.

A typical portable data collection terminal 100 is small and lightweight and is easily held in the hand of the operator during use. Data is collected and stored in terminal 100 as it is entered by the user by either pressing the appropriate keys on keypad 102 or by "scanning" bar code 106 with wand 104. However, in many situations, it is cumbersome to enter data or commands by scanning bar code 106 or entering data on keypad 102. Further, data collection is more efficient if one or both hands are free.

To "scan" bar code 106 using wand 104, an operator presses switch 105 and then passes wand 104 over bar code 106 in a linear direction substantially perpendicular to the bars. The scanned bar code is decoded by decoder computer 201 and stored in nonvolatile read/write memory 202. Enunciator 108 typically beeps after a scan to inform the user that the bar code has been decoded properly. Decoder computer 201 typically includes a central processing unit (CPU) 214, volatile read/write memory 213, typically static random access memory (SRAM), and nonvolatile read only program memory 215, typically erasable programmable read only memory (EPROM). EPROM 215 contains the firmware that is executed by CPU 214 and that tells CPU 214 what to do. Herein, firmware, program, and software are used interchangeably.

Depending on the process running in terminal 100, (FIG. 2) additional prompts and messages may be displayed on LCD 103 to direct the operator to take various actions such as "Enter Quantity:" or "Enter Item:". In addition, beep tones of various frequencies or a series of beeps may be used to prompt the user to take various actions. However, in many situations, it is cumbersome to read LCD 103, count the beeps, or listen for certain tones while scanning bar codes. Further, data collection is more efficient if it can be done without referring to LCD 103 for the next action to be taken.

In a data collection mode, visual prompts are displayed on LCD 103 to inform the user of the information to be entered. This information may be entered by either scanning one or more bar codes using bar code scanner 104 or keying in the information using keypad 102. As the data is collected, the data is stored in nonvolatile read/write memory 202. When data collection is complete, portable data collection terminal 100 is connected to host computer 210 through input/output (I/O) interface 209. Portable data collection terminal 100 is then put into data upload mode and the collected data is transmitted to host computer 210.

U.S. Pat. No. 5,208,449, entitled "Portable Transaction Terminal," of Eastman et al. issued on May 4, 1993, teaches:

A headset to be worn around the head of an operator having a head-band, a microphone, a bar code reader, a display, electronics including a microprocessor and speech recognition for translating alphanumeric names and words into data which are to be stored in the memory of the microprocessor and a transceiver for exchanging data with a remotely located modem. Upon a voice activation, messages issued by the microprocessor are visually projected on a display and the reader is initiated.

U.S. Pat. No. 5,208,449, Abstract.

The headset of Eastman is useful in limited situations. The headset eliminates some the problems associated with looking at a display within a hand-held unit. In addition, Eastman provides a capability for both audio and visual feedback for entered data. However, scanning bar codes with a headset is often cumbersome and difficult. In addition, Eastman does not provide the user a capability to create customized voice prompts. Therefore, the headset is useful only in a limited set of applications.

SUMMARY OF THE INVENTION

In accordance with the principles of this invention, a portable data collection system includes a portable data collection terminal with a voice prompt circuit, a voice recognition circuit, and optionally a bar code scanning device, such as a wand. The portable data collection terminal of this invention is similar in size and performs the same data collection functions as prior art portable data collection terminals but adds voice prompts and voice recognition for improved functionality, flexibility, and ease of use.

When data is entered from either a keypad, a bar code scanner, or by voice, which are all examples of data input means, or when the operator needs to be prompted to take a particular action, the voice prompt circuit of the portable data collection terminal is activated to provide an oral voice prompt to the user. The oral voice prompt is a significant improvement over the beeps, tones, and visual messages provided by prior art portable data collection terminals. The voice recognition circuit further enhances performance and ease of use by allowing the user to orally enter data or commands.

In one embodiment, the portable data collection terminal of this invention includes a voice prompt circuit, a voice recognition circuit, a data input means, and a decoder computer. When the portable data collection terminal of this invention is turned on, power is delivered to the decoder computer from a power supply. The decoder computer runs a program that displays messages on a display of the portable data collection terminal, and prompts the user using the voice prompt circuit of this invention.

The user selects the mode of operation of the portable data collection terminal by using the data input means, which can include either a keypad, a bar code scanner, or a voice command. The signal generated in response to either pressing a key on the keypad or scanning a bar code using the bar code scanner is processed by the decoder computer. The voice command is processed by the voice recognition circuit and then passed to the decoder computer for processing. For example, when the bar code scanner is scanned across a bar code, the output voltage from the bar code scanner is sent to the decoder computer. The decoder computer decodes the scanned bar code and stores the information in a nonvolatile read/write memory in a manner well-known to those skilled in the art.

After the scanned bar code is decoded, for example a bar code representing "4983", the decoder computer automatically activates the voice prompt circuit; addresses the oral messages stored in the voice prompt circuit; and sends the necessary commands to the voice prompt circuit to retrieve and play the oral messages. Thus, the voice prompt circuit responds with the oral voice prompt "Enter quantity" to prompt the user to now enter additional information about the item that was scanned.

The voice recognition circuit is automatically activated for a length of time after completion of the voice prompt to allow the user to enter this data by using their voice. The user may say "2", "5", "enter" and the voice recognition circuit converts the voice patterns into data and stores the data in memory.

As data is collected, the user is prompted by the information on the display, an oral voice prompt from the voice, prompt circuit of this invention, or both. By entering data using a bar code scanner and voice recognition, and by using voice prompts for feedback, the user may efficiently and reliably use voice for supplemental data entry and is therefore more productive. Thus, voice prompts provide the ability to combine visual messages and oral voice prompts. Further, the oral voice prompts generated by the voice prompt circuit provide the convenience and speed of not having to look at the display when using the portable data collection terminal of this invention. Additionally, the voice recognition circuit allows data entry or commands without using either the keypad or additional bar code charts thereby freeing the hands of the user.

DETAILED DESCRIPTION

Figure 1:
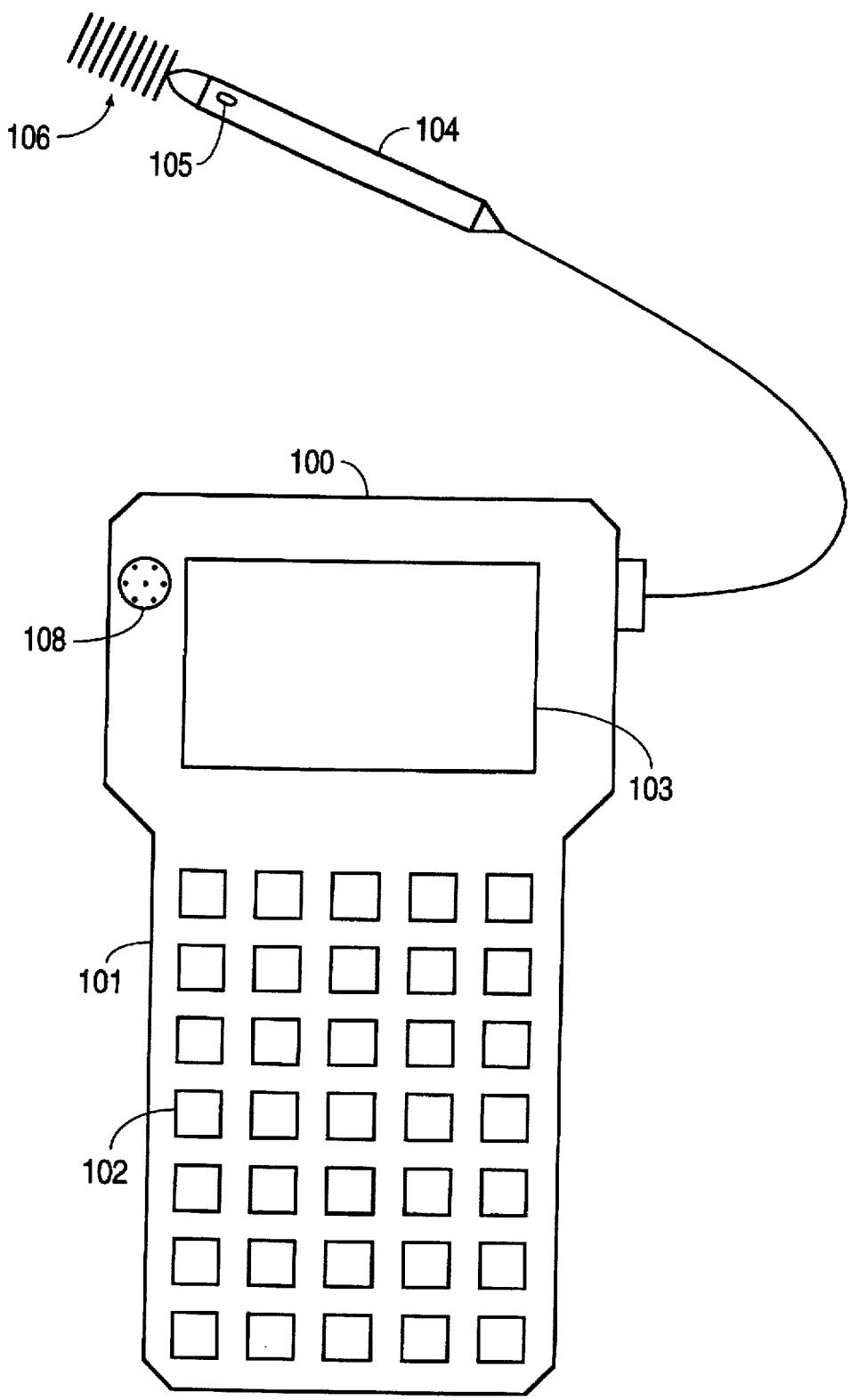
FIG. 1 illustrates a typical prior art portable data collection terminal with a bar code scanner attached.
Figure 2:
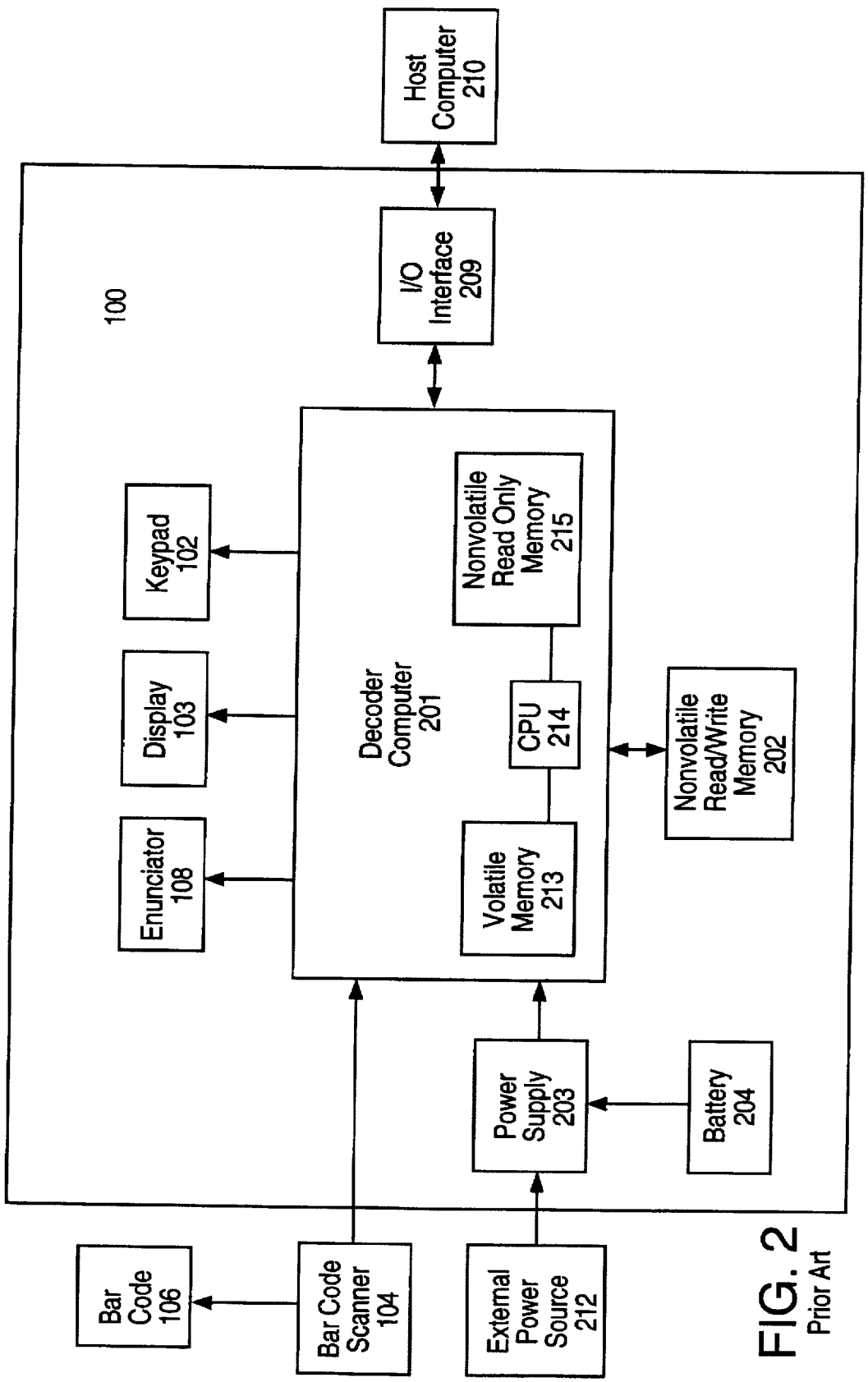
FIG. 2 is a block diagram of a typical prior art portable data collection terminal.

In accordance with the principles of this invention, a portable data collection system includes a portable data collection terminal 300 with a voice prompt circuit, and optionally a bar code scanning device, such as wand 304. In another embodiment, portable data collection terminal 300 also includes a voice recognition circuit.

Portable data collection terminal 300 with the voice recognition circuit is similar in size and performs the same data collection functions as prior art portable data collection terminals but adds voice prompts and voice recognition for improved functionality, flexibility, and ease of use. When data is entered from either a keypad 302, or a bar code scanner 304, or when the operator needs to be prompted to take a particular action, a voice prompt circuit is activated to provide an oral voice prompt to the user. The user may respond to the oral voice prompt and provide the information orally, i.e., by speaking to portable data collection terminal 300. Portable data collection terminal 300 processes the oral information without any action on the part of the user other than orally providing the information. The voice recognition provided by portable data collection terminal 300 is a significant improvement over keying data on keypad 102 or scanning barcode 106 using scanner 104 that were typically provided by prior art portable data collection terminals.

Figure 3:
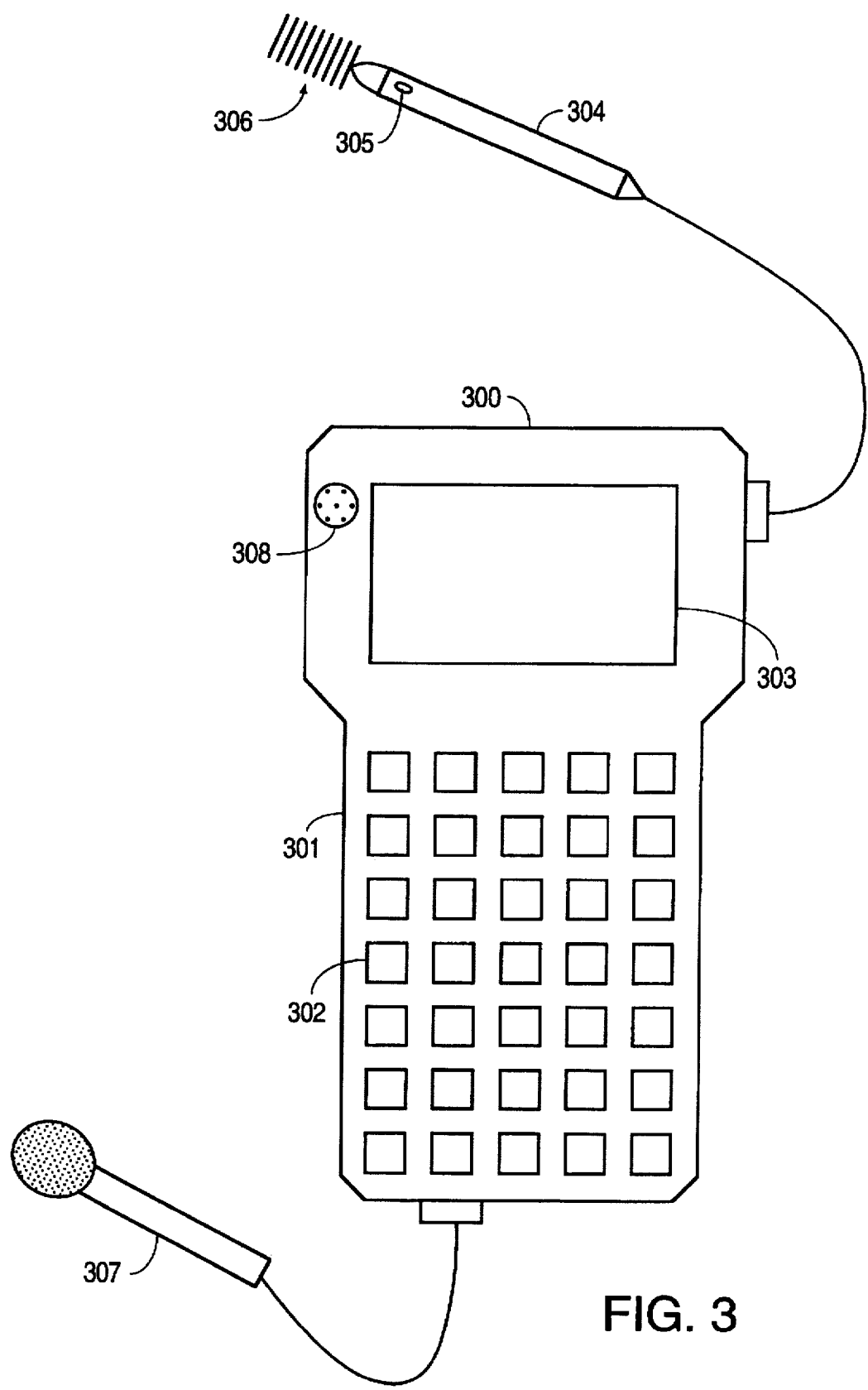
FIG. 3 illustrates a portable data collection terminal of this invention with a bar code scanner attached and voice prompt capability.

While in FIG. 3, bar code scanner 304 is connected by a cable to portable data collection terminal 300, this is only illustrative of a bar code scanner and is not intended to limit the invention to a cabled wand. Bar code scanner 304 can also be built as an integral part of portable data collection terminal 300. Alternatively, bar code scanner 304 can be a cordless wand that transmits data to portable data collection terminal 300. For example, the cordless wand, sold by Worthington Data Solutions of Santa Cruz, Calif. as Model No. W51 could be utilized with portable data collection terminal 300.

Components 104, 103, 102 and bar code 106 of portable data collection terminal 100 are, in this embodiment, the same as components 304, 303, 302 and bar code 306, respectively of portable data collection terminal 300.

Figure 4:
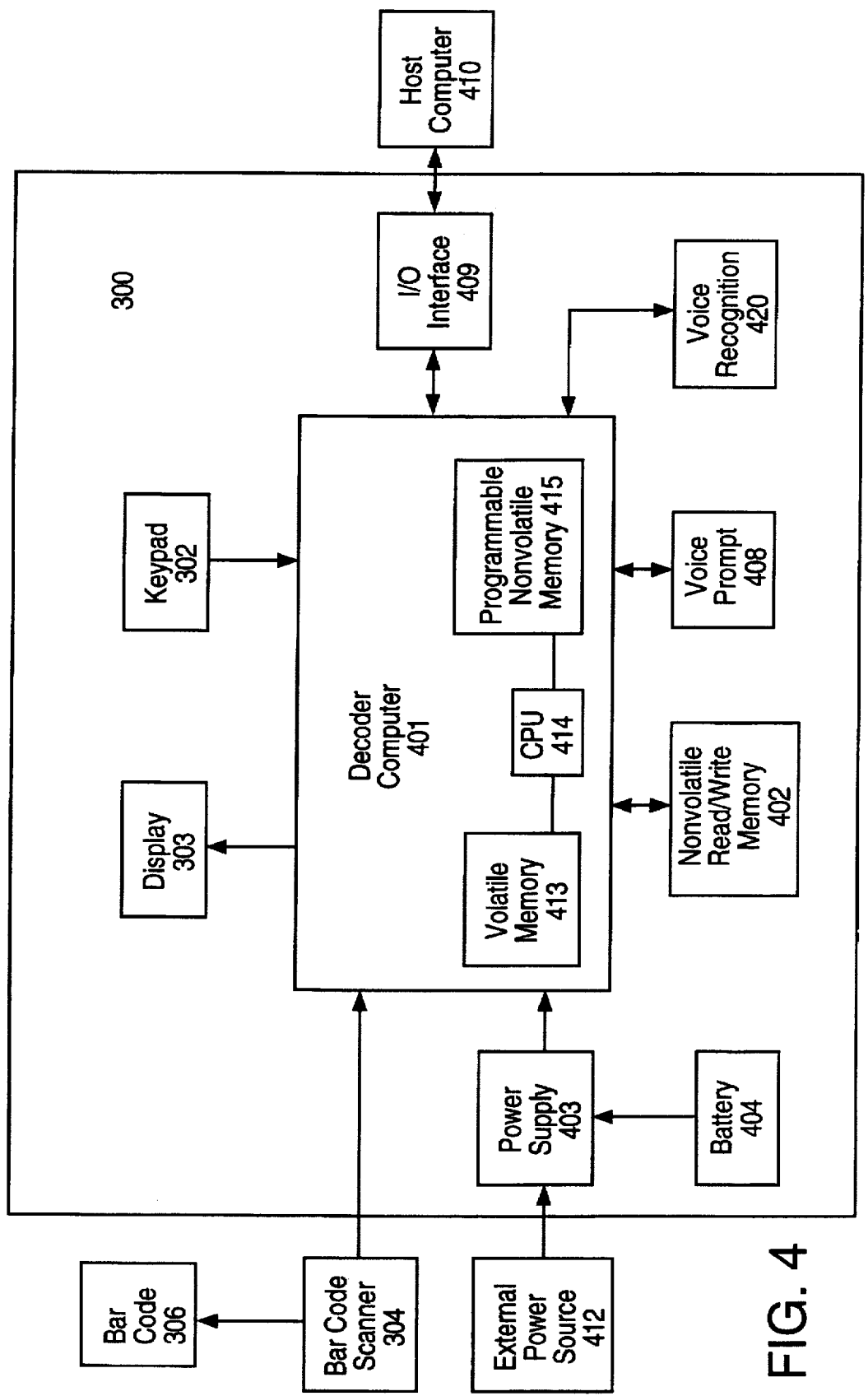
FIG. 4 is a block diagram of the portable data collection terminal of this invention.

In one embodiment, portable data collection terminal 300 of this invention includes a voice prompt circuit 408 (FIG. 4), voice recognition circuit 420, keypad 302, display 303, power supply 403, optionally bar code scanning device 304, nonvolatile read/write memory 402 for data storage, and a decoder computer 401 that includes central processing unit (CPU) 414, volatile read/write memory 413, and programmable non-volatile program memory 415. Programmable non-volatile memory 415 is used instead of non-programmable read-only memory for CPU 414 to support storage of voice recognition vocabularies. When portable data collection terminal 300 of this invention is turned on, power is delivered to decoder computer 401 from power supply 403. Power supply 403 is driven by either an internal battery 404 or by an external power source 412. Again components 401, 402, 403, 404, 409, 413 and 414 of portable data collection terminal 300 are, in this embodiment, the same as components 201, 202, 203, 204, 209, 213 and 214 respectively of prior art portable data collection terminal 100.

Decoder computer 401 runs a program that displays messages on display 303 and can prompt the user using voice prompt circuit 408 as well. The user selects the mode of operation by either pressing a key on keypad 302, scanning bar code 306 using bar code scanner 304, or speaking a voice command that is recognized by voice recognition circuit 420. The signal generated in response to either pressing a key on keypad 302 or scanning bar code 306 is processed by decoder computer 401, as described more completely below. The voice command is processed by voice recognition circuit 420 and then sent to decoder computer 401, as described more completely below.

In a data collection mode of terminal 300, when bar code scanner 304 is scanned across bar code 306, the output voltage from bar code scanner 304 is representative of bar code 306. This output voltage is sent to decoder computer 401 which decodes bar code 306 and stores the information in nonvolatile read/write memory 402 in a manner well-known to those skilled in the art.

In this embodiment, decoder computer 401 uses programs stored in programmable non-volatile memory 415 to decode the voltage generated by scanning bar code 306. The programs stored in programmable non-volatile memory 415 are similar to prior art programs except the programs include the capability to send addresses and control signals, sometimes referred to as "commands" to voice prompt circuit 408 to generate the desired oral voice prompt. Programmable non-volatile memory 415 also contains programs to communicate with voice recognition circuit 420. The modification required to the prior art programs to include both voice prompt and voice recognition capability, or either capability individually, will be apparent to those skilled in the art in view of the following disclosure.

Voice prompt circuit 408 can be activated at any time. Voice prompt circuit 408 is typically automatically activated in response to data input such as a user pressing a key on keypad 302 or scanning bar code 306. For example, a user may press key "1" on keypad 302 and in response, the number "one" is spoken back by voice prompt circuit 408 in the user's language to confirm that key "1" was pressed. Alternatively, after a multi-digit number such as "2398" is entered by the user and the "Enter" key is pressed, voice prompt circuit 408 responds with the oral voice prompt of either "two thousand nine hundred and eight" or "two, three, nine, eight" depending on the programming of portable data collection terminal 300.

After scanning a bar code of the number "4983," voice prompt circuit 408 responds with the oral voice prompt "four, nine, eight, three," or in another mode "code thirty-nine, four, nine, eight, three" to identify the type of code and the data stored in the bar code. If portable data collection terminal 300 is configured as a bar code verifier, terminal 300 responds with qualitative oral statements describing the characteristics of the scanned bar code.

To assist the user with data collection, voice prompt circuit 408 can respond to scanned or entered data with voice prompts such as "Enter item number", "Scan user ID", or "Bad Item Number, Re-enter". Any message that can be spoken can be stored in voice prompt circuit 408. The only limitation is the length of time of the message. In a similar way, any word or phrase that can be spoken can be programmed into voice recognition circuit 420 so any spoken word or phrase is subsequently recognized. Again, the only limitation is the length of the word or phrase.

As data is collected, the user is prompted by the information on display 303, the oral voice prompt from voice prompt circuit 408, or both. By entering data using bar code scanner 304 and using voice prompts from voice prompt circuit 408 for feedback, the user need not refer to display 303 to determine the next course of action and is therefore more productive. Thus, voice prompts provide the ability to combine visual messages and oral voice prompts. Further, the oral voice prompt generated by voice prompt circuit 408 provides the convenience and speed of not having to look at the display when using portable data collection terminal 300.

In addition, when voice recognition is used in conjunction with voice prompts, the user is freed from having to enter data using bar code scanner 304 or keypad 302. For example, in an inventory application, the user scans bar code 306 on an item. Decoder computer 401 decodes the signals from bar code scanner 304 and stores the data in programmable non-volatile memory 415. Decoder computer 401 commands voice prompt circuit 408 to play the message "Enter Quantity:" and enables voice recognition circuit 420 for input. The user may now speak a number or numbers for the quantity of the item followed by the word "Enter". Voice recognition circuit 420 receives the sounds spoken by the user and sends the appropriate data to decoder computer 401 which in turn stores that data along with the previously entered data in programmable non-volatile memory 415. Thus, the combination of voice prompts and voice recognition simplifies data entry since the user need not use keypad 302 or another bar code 306 chart to enter data thereby freeing the hands of the user and so increasing productivity and convenience.

Voice prompt circuit 408 can record and playback any message spoken to it. To facilitate play back of the messages in any desired sequence, each recorded message is assigned an index which is subsequently used to access the recorded message, as explained more completely below. Voice prompt circuit 408, in one embodiment, can record up to 40 seconds of indexed messages that can be combined in any order during playback.

Figure 5:
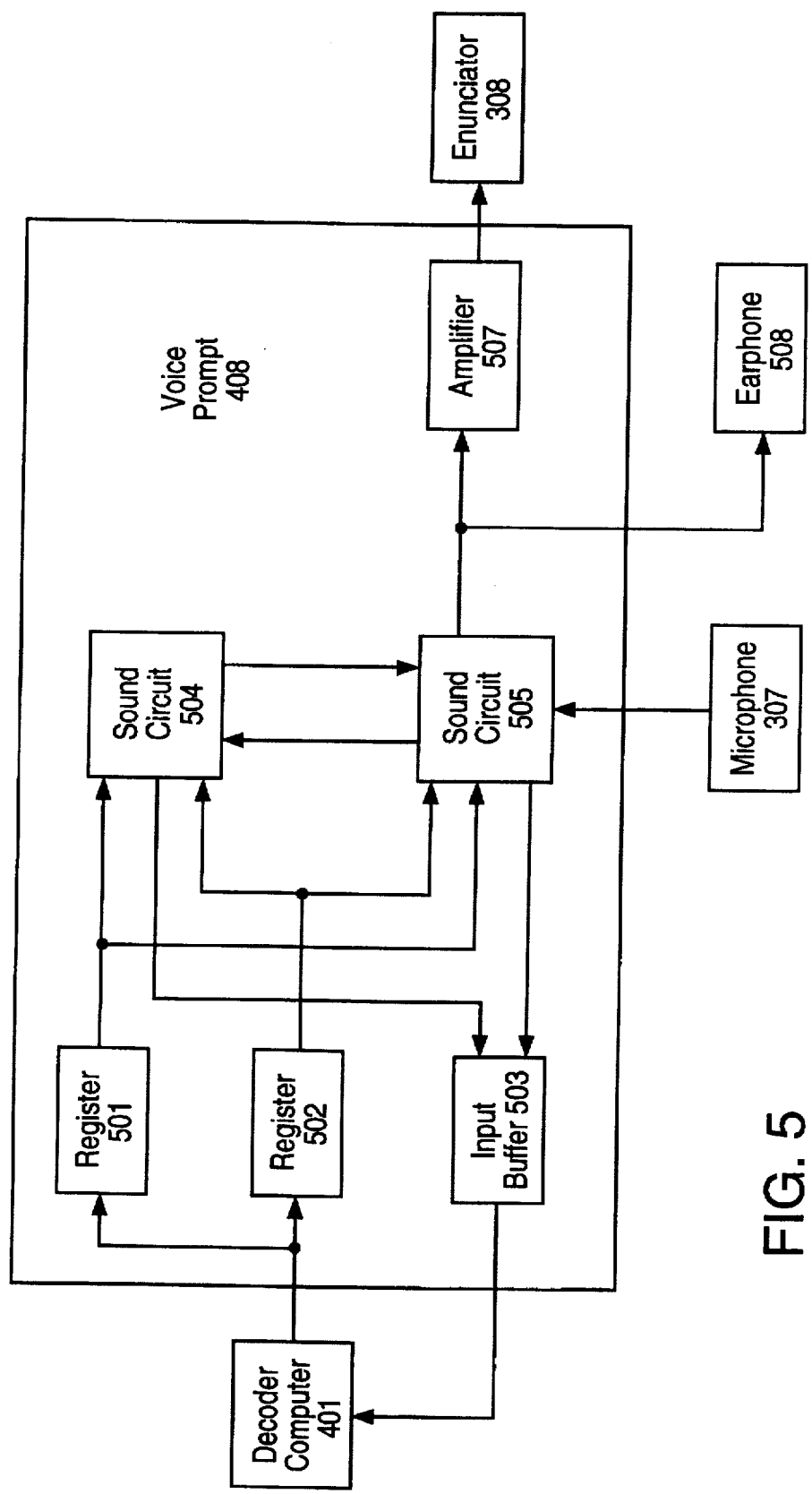
FIG. 5 is a block diagram of the voice prompt circuit in one embodiment of the portable data collection terminal of this invention.

FIG. 5 is a more detailed block diagram of one embodiment of voice prompt circuit 408. In this embodiment, two direct analog storage integrated circuits are used to store the up to 40 seconds of recorded messages. One integrated circuit is configured as master sound circuit 505 and the other as slave sound circuit 504. Each sound circuit can store 20 seconds of recorded messages. Only one sound circuit can playback or record messages at a time. After master sound circuit 505 has been filled with 20 seconds of messages slave sound circuit 504 is used to store the next 20 seconds of messages. An input buffer 503 is provided to allow decoder computer 401 to monitor the status of sound circuits 504 and 505 to determine when a voice prompt has terminated playing.

An electret condenser microphone 307 is attached to the microphone input terminal of master sound circuit 505 to allow recording of custom messages by the user. A microphone input circuit, which is described more completely below, includes a bias network that converts audio frequency waves from microphone 307 into electrical signals which are further low pass filtered and preamplified by master sound circuit 505. An AGC (Automatic Gain Control) circuit in master sound circuit 505 is utilized to control the gain of the preamplifier. The AGC circuit reduces amplification on loud sounds to eliminate clipping, and increases amplification on soft sounds to make them louder.

The signal from the preamplifier is amplified and sampled by master sound circuit 505 and then stored in one of sound circuits 504 or 505. Specifically, a nonvolatile CMOS analog storage array using EEPROM technology is provided in sound circuits 504 and 505 to reduce power consumption and lower cost. The incoming signal is sampled at 125 μsec intervals and sequentially stored in the nonvolatile CMOS analog storage array. Since this array is an EEPROM structure, no external power is required to retain the signals once they are stored in the array. While in this embodiment the nonvolatile storage means is a CMOS EEPROM structure, those skilled in the art will appreciate that a variety of volatile and nonvolatile storage means can be utilized. The storage means selected depends on the sound circuits used, power constraints and cost, for example.

Decoder computer 401 has control over the various modes of operation of sound circuits 504 and 505. The operational modes for voice prompt circuit 408 are record and playback. To save battery power, a power down mode of voice prompt circuit 408 is selected by decoder computer 401 when no recording or playback functions are desired.

Master sound circuit 505 includes an output filter that reduces sampling frequency noise and smooths the output waveform. The output signal from master sound circuit 505 is amplified by amplifier circuit 507 to about 250 mW RMS. The amplified signal from amplifier circuit 507 directly drives a enunciator 308 with an impedance of 8 ohms or greater. An earphone 508 may also be used instead of, or in addition to, speaker 509 for monitoring the audio output. For example, earphone 508 is directly connected to the speaker output pin of master sound circuit 505.

As described more completely below, voice prompts are generated by voice decoder circuit 408 in response to decoder computer 401 writing two bytes of information into output registers 501 and 502. First, the address of the voice prompt is loaded and then the play command. Registers 501 and 502 store the addressing information used to select one oral message from the plurality of oral messages stored in sound circuits 504 and 505. Registers 501 and 502 also store operational mode commands for sound circuits 504 and 505, such as play/record (P/R), power down (PD), and chip enable (CE).

Messages are recorded in portable data collection terminal 300 by adding microphone 307. No additional hardware or software is required to record the messages. In one method of recording a message, the user selects a number for the message by pressing the appropriate keys on keypad 302, and then presses a predetermined key on keypad 302 to begin recording. CPU 414 issues a beep from enunciator 308 when CPU 414 is ready to record. The user speaks into microphone 506 and the message is recorded by sound circuits 504 and 505. When the length of time allotted for the message has passed, CPU 414 issues another beep from enunciator 308 and the recording process stops.

CPU 414 uses the number entered by the user to index the message. The message stored in sound circuits 504 or 505 can be played back in any order to generate a voice prompt. For example, if message #045 was "Enter", message #029 was "Data", and message #073 was "Quantity", the voice prompt "Enter Data" is created by playing message #045 followed by a short delay then message #029. Similarly, the voice prompt "Enter Quantity" is generated by playing message #045 followed by a short delay then message #073. Thus, many voice prompts may be created from a selected group of messages. The voice prompts are created by providing an appropriate program in programmable nonvolatile memory 415 for execution by CPU 414. Custom voice prompts may be recorded by the user or created from recorded messages.

Herein, a "message" is one indexed oral entry that is stored in sound circuits 504 and 505. A "voice prompt" is the playback of a "message" or a group of "messages" by CPU 414 in response to instructions stored in programmable non-volatile memory 415. Thus, a customized voice prompt can be a single message. However, more flexibility is generally provided by storing a plurality of messages in sound circuits 504 and 505 and using various combinations of the stored messages to create a plurality of voice prompts.

Figure 6A:
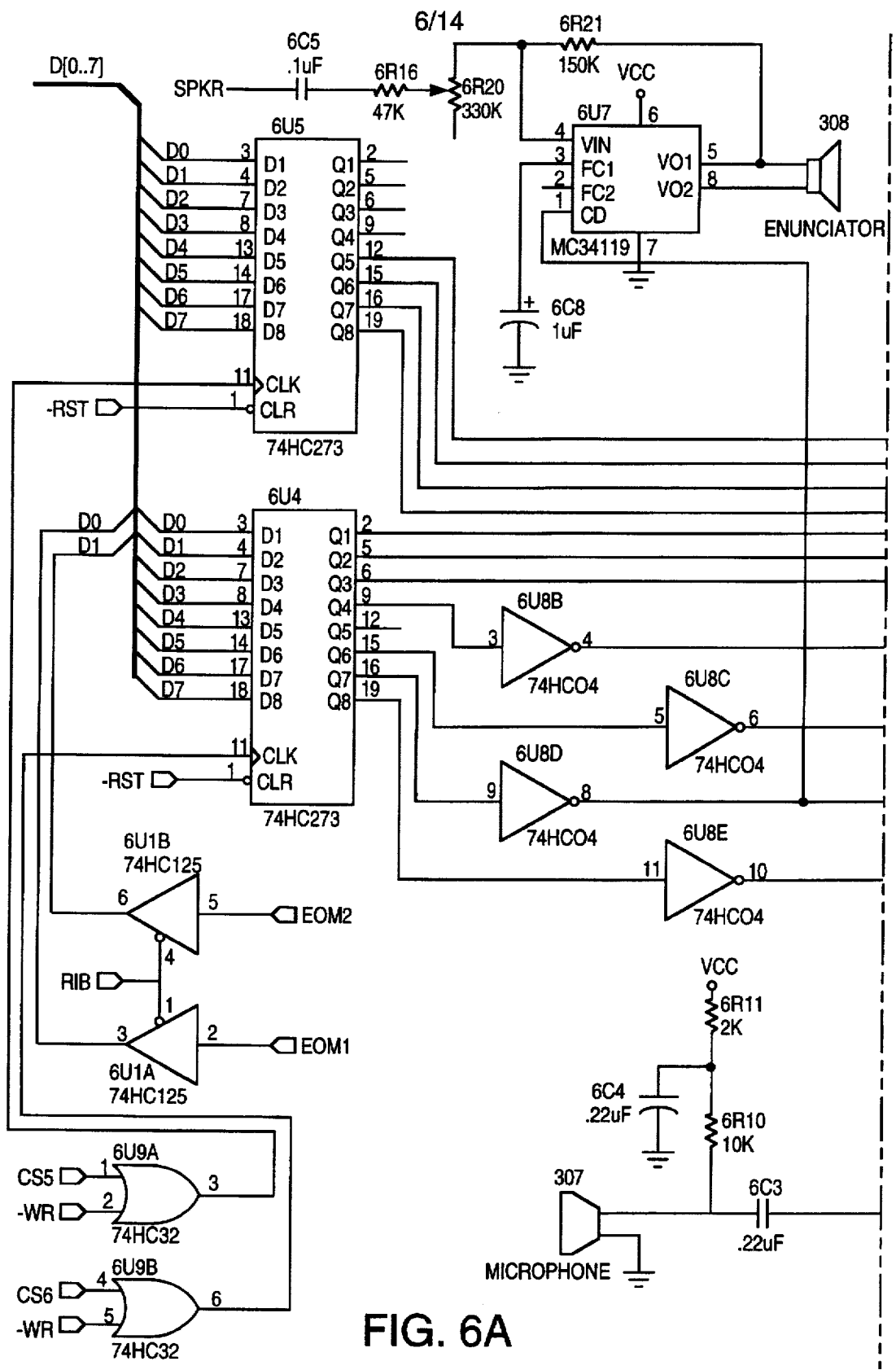
FIG. 6 is a wiring diagram of the voice prompt circuit of FIG. 5.
Figure 6B:
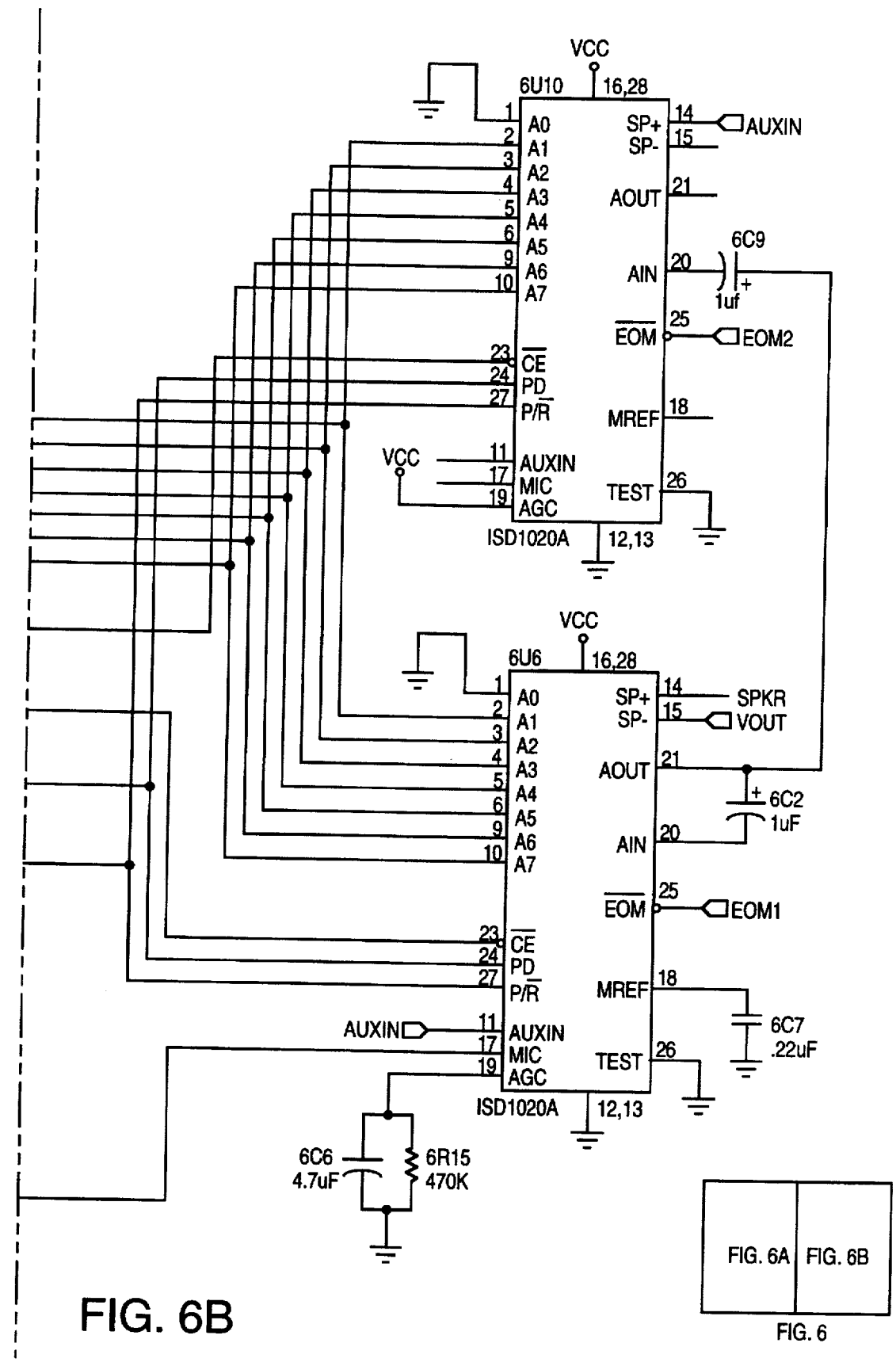

One embodiment of the voice prompt circuit 408 of portable data collection terminal 300 is illustrated in more detail in FIG. 6. Registers 501 and 502 are eight-bit registers 6U4 and 6U5. One eight-bit register integrated circuit suitable for use in this inventions is sold by Texas Instruments as Part No. 74HC273. Eight-bit registers 6U4 and 6U5 have I/O addresses 0005H and 0006H respectively in the I/O address space of decoder computer 401.

A command or a message address, collectively referred to as data, is loaded into eight-bit register 6U5 when CPU 414 writes to I/O address 0006H and a command or a message address is loaded into eight-bit register 6U4 when CPU 414 writes to I/O address 0005H. Specifically, the I/O address 0005H from CPU 414 is decoded as a low signal on line CS5 during an I/O cycle and I/O address 0006H from CPU 414 is decoded as a low signal on line CS6 during an I/O cycle. One skilled in the art will appreciate that the logic levels and logic gates described herein are only illustrative and the invention can be implemented using both other logic gates and other logic levels.

Line CS5 is connected to a first input terminal of logic OR gate 6U9A. The other input terminal of logic OR gate 6U9A is driven by CPU 414 signal -WR. The output terminal of logic OR gate 6U9A is connected to terminal CLK of eight-bit register 6U5.

Line CS6 is connected to a first input terminal of logic OR gate 6U9B. The other input terminal of logic OR gate 6U9B is driven by CPU 414 signal -WR. The output terminal of logic OR gate 6U9B is connected to terminal CLK of eight-bit register 6U4.

During the write, the I/O address of the register to be written to is output onto the address bus (not shown) which is decoded to drive the signal on one of lines CS5 or CS6 low. The signal on line -WR is driven low and data is output onto data bus lines D0–D7 from CPU 414. The data is loaded into either 8-bit register 6U4 or 8-bit register 6U5 by the rising edge of the signal on write line -WR which is driven by CPU 414. Bits 4 through 7 of 8-bit register 6U5 drive address input terminals A1 through A4 of both sound integrated circuits 6U6 and 6U10. Bits 0 through 2 of 8-bit register 6U4 drive address input terminals A5 through A7 of both sound integrated circuits 6U6 and 6U10.

Bit 3 of 8-bit register 6U4 drives inverter 6U8B which in turn drives chip enable input terminal of sound integrated circuit 6U10. Bit 5 of 8-bit register 6U4 drives inverter 6U8C which in turn drives chip enable input terminal $\overline{CE}$ of sound integrated circuit 6U6 through inverter 6U8C. Command $\overline{CE}$ for sound integrated circuit 6U10 is issued when a logic one value is loaded into bit 3 of eight-bit register 6U4. CPU 414 issues command $\overline{CE}$ for sound integrated circuit 6U6 by loading a logic one value into bit 5 of 8-bit register 6U4.

Bit 6 of 8-bit register 6U4 drives inverter 6U8D which in turn drives power down input terminals PD of sound integrated circuits 6U6 and 6U10 and input terminal CD of audio amplifier 6U7. CPU 414 issues command PD to sound integrated circuits 6U6 and 6U10 and audio amplifier 6U7 by loading a logic zero value into bit 6 of 8-bit register 6U4.

Bit 7 of 8-bit register 6U4 drives inverter 6U8E, which in turn drives play/record input terminal P/R of sound integrated circuits 6U6 and 6U10. CPU 414 issues the play command to sound integrated circuits 6U6 and 6U10 by loading a logic zero value into bit 7 of 8-bit register 6U4. The record command is issued to sound integrated circuits 6U6 and 6U10 when CPU 214 loads a logic one value into bit 7 of 8-bit register 6U4.

Input buffers 6U1A and 6U1B allow CPU 414 to monitor the playback status of sound integrated circuits 6U6 and 6U10. Input buffer 6U1A is driven by sound integrated circuit 6U6 signal EOM1. Input buffer 6U1B is driven by sound integrated circuit 6U10 signal EOM2. The input buffer enable lines of input buffers 6U1A and 6U1B are connected together and driven by the read input buffer (RIB) signal from CPU 414. In response to CPU 414 driving signal RIB low input buffers 6U1A and 6U1B drive data lines D0 and D1.

Address input line A0 of both sound integrated circuits 6U6 and 6U10 is connected to ground. Each sound integrated circuit, in this embodiment, supports a maximum of 160 messages of 125 milliseconds each. Connecting address input line A0 to ground halves the number of messages supported to 80, but the length of each message is doubled to 250 milliseconds. Preferably, sound integrated circuits 6U6 and 6U10 have the characteristics given in Table 1.

TABLE 1

| Characteristics of Sound Integrated Circuits 6U6 and 6U10 |
| --- |
| 1) Single-integrated circuit voice record and playback |
| 2) Direct Analog Storage Technology |
| 3) Built-in microphone preamplifier, automatic gain control, and filtering |
| 4) Nonvolatile EEPROM technology |
| 5) 5 VDC operation |
| 6) 25 mA maximum current draw during operation |
| 7) 10 µA maximum current draw during power down |

An important aspect in selecting a sound integrated circuit is that sound integrated circuits 6U6 and 6U10 require only a few external components so that size, weight, and power consumption of portable data collection terminal 300 is minimized. One sound integrated circuit suitable for use in portable data collection terminal 300 of this invention is sold by Information Storage Devices of San Jose, Calif. under Model No. ISD1020A.

Figure 7:
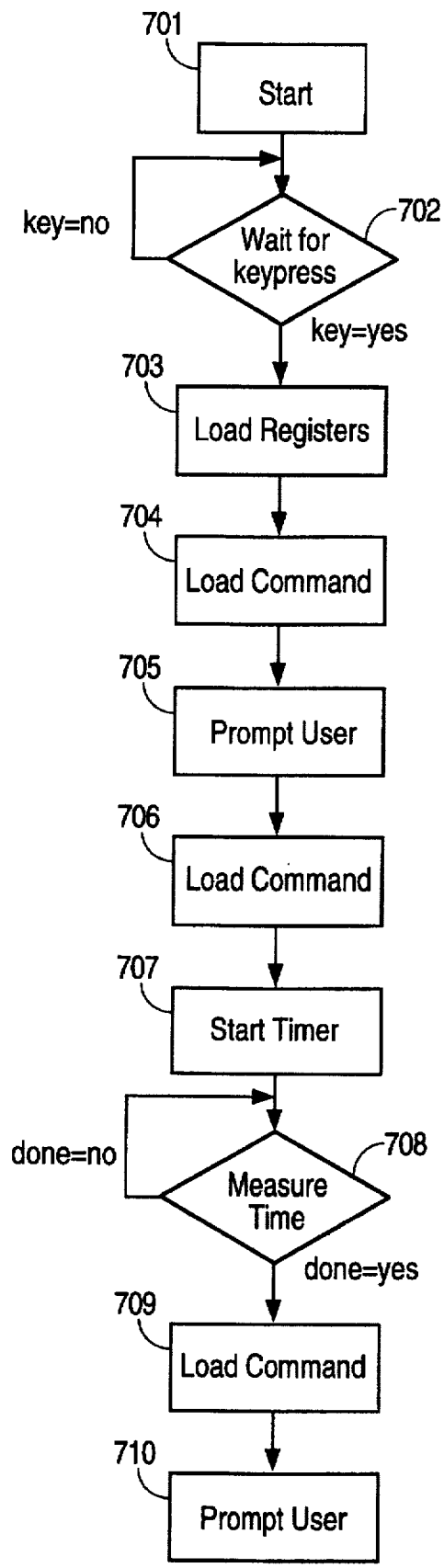
FIG. 7 is a flow chart illustrating the steps in a program that is executed by the CPU in the portable data collection terminal to record a voice prompt.
Figure 8:
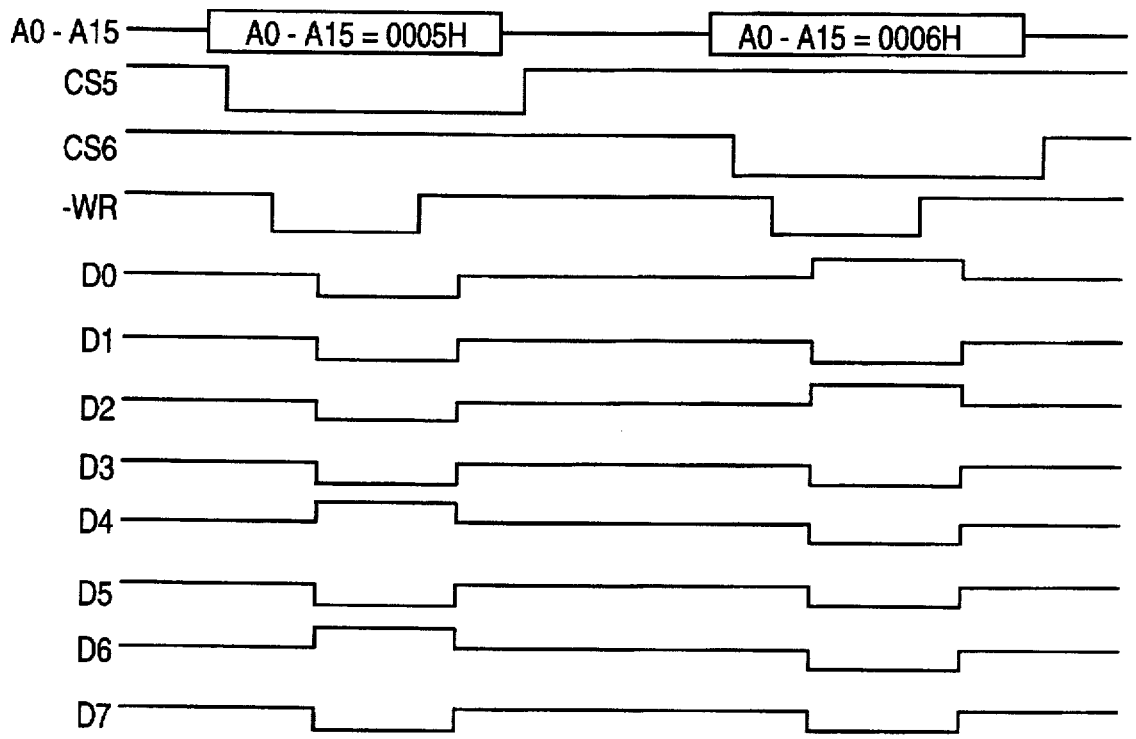
FIG. 8 is a timing diagram illustrating events (control signals) vs. time for a control sequence in the flowcharts in FIGS. 7 and 12.

FIG. 7 illustrates the flow of commands issued by decoder computer 401 to voice prompt circuit 408 to record a voice prompt into sound integrated circuits 6U6 and 6U10. To start the recording process at start step 701, the user enters a number to identify the voice prompt to be recorded. Step 702, wait for key press, is then initiated. CPU 414 scans for signals from keypad 302 and waits for the user to press a predetermined key to begin recording. When CPU 414 detects that the predetermined key for recording an oral message has been pressed, load registers step 703 is initiated. CPU 414 loads the starting address of the message to be recorded into 8-bit registers 6U4 and 6U5. The starting address is referenced to the number entered by the user for the message. A timing diagram 800 of loading 8-bit registers 6U4 and 6U5 with address AAH for sound integrated circuits 6U6 and 6U10 is presented in FIG. 8. The address on the CPU address bus is represented by reference label A0–A15 and is simply shown as either 0005H or 0006H. The remaining signals are the signals on lines CS5, CS6, -WR and bus D0 to D7 (FIG. 6) respectively. FIG. 8 shows that first the signal on line CS5 is driven low so that CPU 414 can write to register 6U5.

After the signal on line CS5 is taken low, the signal on line -WR is driven low. When the signal on line -WR is low, the signals on lines D0 to D3, D5 and D7 are taken low and the signals on lines D4 and D6 are driven high. When the signals on lines D0 to D7 are stable, the signal on line -WR is driven high and the rising edge loads the values on lines D0 to D7 into register 6U5.

After register 6U5 is loaded, the signals are dropped on line D0 to D7 and the signal on line CS5 is taken high. This completes the loading of register 6U5. Register 6U4 is loaded in a similar fashion when the address 0006H is driven on address bus A0–A15. Note that in loading register 6U4 with an address, bit D1 is driven low and bits D0 and D2 are driven high. Note that in these examples unused data lines are driven low but either state provides the same result.

After the registers are loaded with the starting address, in a first load command step 704, CPU 414 loads the record command and the power-up command into 8-bit register 6U4. CPU 414 beeps speaker 509 in a first prompt user step 705 to alert the user that the recording process is beginning. This is immediately followed by CPU 414 loading the chip enable command into 8-bit register 6U4 in a second load command step 706.

Figure 9:
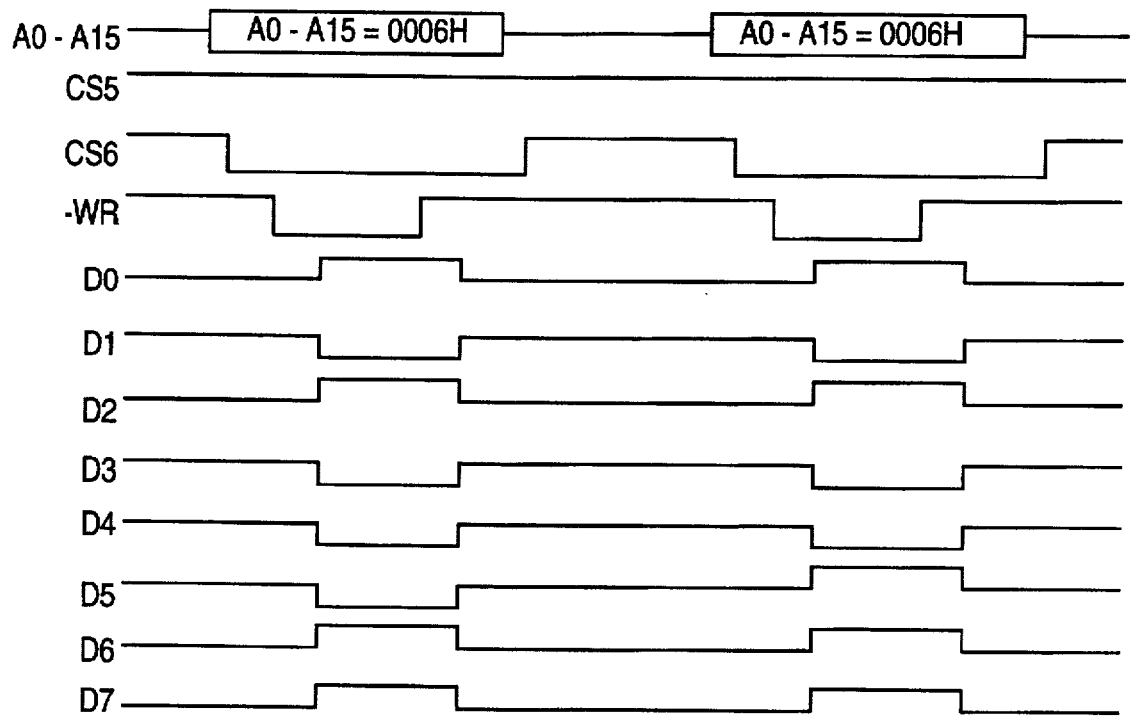
FIG. 9 is a timing diagram illustrating events vs. time for a control sequence in the flowchart in FIG. 7.

FIG. 9 is a timing diagram for loading 8-bit register 6U4 with the power-up command followed by the chip enable command in record mode for sound integrated circuit 6U6. Since bits 5 to 7 of register 6U4 control the chip enable, power-up, and play/record respectively commands, CPU 414 writes to I/O address 0006H. The timing sequence for signals on lines CS6, -WR and data bus D0 to D7 is the same as that described for FIG. 8. First, the signal on line CS6 is driven low. Next CPU 414 drives the signal on line -WR low. After the signal on line -WR is low, CPU 414 drives the signals on lines D0, D2, D6 and D7 high and the signals on lines D1, D3, D4, and D5 low. The signals on lines D0 to D7 are held in their respective states until CPU 414 drives the signal on line -WR high which in turn loads the record and power-up signals on lines D0 to D7 into register 6U4.

In start timer step 707, CPU 414 begins measuring the time of the recording. The words spoken by the user into microphone 307 are recorded by sound integrated circuit 6U6 or 6U10. Preferably, microphone 307 has the characteristics given in Table 2.

TABLE 2

Characteristics of Microphone 307

Electret type
1k ohm impedance
Frequency response of 50-8K Hz
Sensitivity of 64 dB
Signal-to-noise ratio of greater than
40 dB
Less than 1 mA current drain
Operates on 2 to 10 VDC One microphone 307 suitable for use in portable data collection terminal 300 is sold by Radio Shack of Fort Worth, Tex. under model number 33-1060. Resistors 6R10 and 6R11 and capacitor 6C4 (FIG. 6) form a bias circuit that provides filtered power to microphone 307. DC blocking capacitor 6C3 is connected between microphone 307 and the preamplifier input stage of sound integrated circuit 6U6. Capacitor 6C3 removes the DC component from the low level audio frequency AC signal from microphone 307.

Inside sound integrated circuit 6U6, amplification is performed in two stages. The audio frequency input signal from microphone 307 on pin MIC of sound integrated circuit 6U6 is preamplified by an input preamplifier. The preamplifier output signal is amplified by a fixed gain amplifier. The fixed gain amplifier drives analog output pin AOUT. The signal path between the analog output and analog input of sound integrated circuit 6U6 is completed by connecting a capacitor 6C2 between the analog output pin AOUT and the analog in pin AIN of sound integrated circuit 6U6. Capacitor 6C2 provides an additional pole for low-frequency cut-off. The signal on analog output pin AOUT of sound integrated circuit 6U6 can also be fed to the slave sound integrated circuit 6U10 by connecting a capacitor 6C9 between pin AOUT of the master sound integrated circuit 6U6 and the pin AIN of the slave sound integrated circuit 6U10. By making these connections either integrated circuit may record the voice input from microphone 307.

An automatic gain control (AGC) circuit inside sound integrated circuit 6U6 dynamically monitors the output signal level of the fixed gain amplifier and sends a gain control voltage to the preamplifier. The preamplifier gain is automatically adjusted to maintain an optimum signal level into the input filter. This gives the highest level of recorded signal while reducing clipping to a minimum.

The characteristics of the AGC circuit are set by two time constants; the attack time and the release time. Attack time is the time required by the AGC circuit to reduce gain in response to an increasing input signal. Release time is the time constant of the gain increase in the presence of a decreasing signal. Resistor 6R15 and capacitor 6C6 set the attack and release time to optimum values for human speech. Noise-canceling common mode rejection is provided in sound integrated circuit 6U6 to reduce background noise from microphone 307 by connecting capacitor 6C7 between pin MREF and ground. Capacitor 6C7 preferably has the same capacitance as capacitor 6C3.

Following the fixed gain amplifier stage is an input filter. Although the storage is analog in nature, sampling techniques are employed and consequently require an anti-aliasing filter to remove or reduce input frequency components above half the sampling frequency. With a sampling frequency of 8 kHz, a high frequency cut-off for the low-pass filter of 3.4 kHz will satisfy the Nyquist Criterion and allow for a frequency band width sufficient for good quality voice reproduction. The input filter is a continuous time, 5 pole low-pass filter with a roll-off of 40 dB per octave at 3.4 kHz.

With signal conditioning completed, the input waveform is written into an analog storage array in the integrated sound circuit beginning at the address stored in 8-bit registers 6U4 and 6U5. Samples are taken by an 8 kHz sample clock and each sample undergoes a level shifting process to produce the voltage required for the nonvolatile writing procedure of the EEPROM array. The sample clock is also used to increment the array decode so that the input samples are stored sequentially in the array. All of these processes are performed automatically by sound integrated circuits 6U6 and 6U10.

Figure 10:
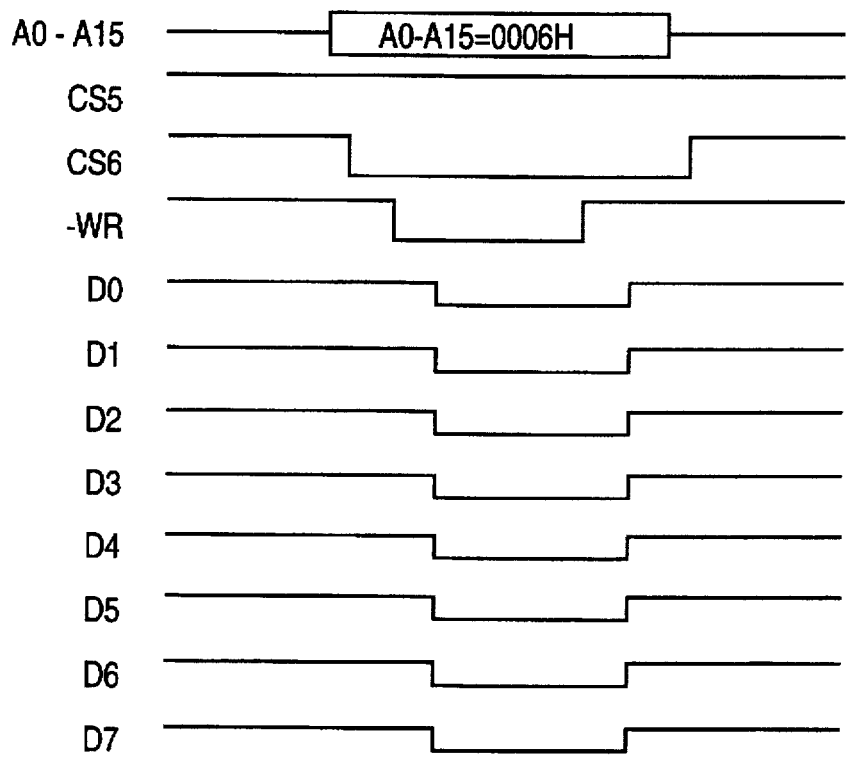
FIG. 10 is a timing diagram illustrating events vs. time for a control sequence in the flowchart in FIGS. 7 and 12.

In time check 708, CPU 414 checks to see if the allocated time for the message has expired. If so CPU 414, in a third load command step 709 loads the disable and power-down command into 8-bit register 6U4. FIG. 10 is a timing diagram of loading 8-bit register 6U4 with the disable and power-down command for sound integrated circuit 6U6. The timing sequence for FIG. 10 is similar to that described above for FIG. 8. Immediately after loading the disable and power-down command CPU 414 beeps enunciator 308 in a second prompt user step 710 to alert the user that the recording process has ended.

Figure 11:
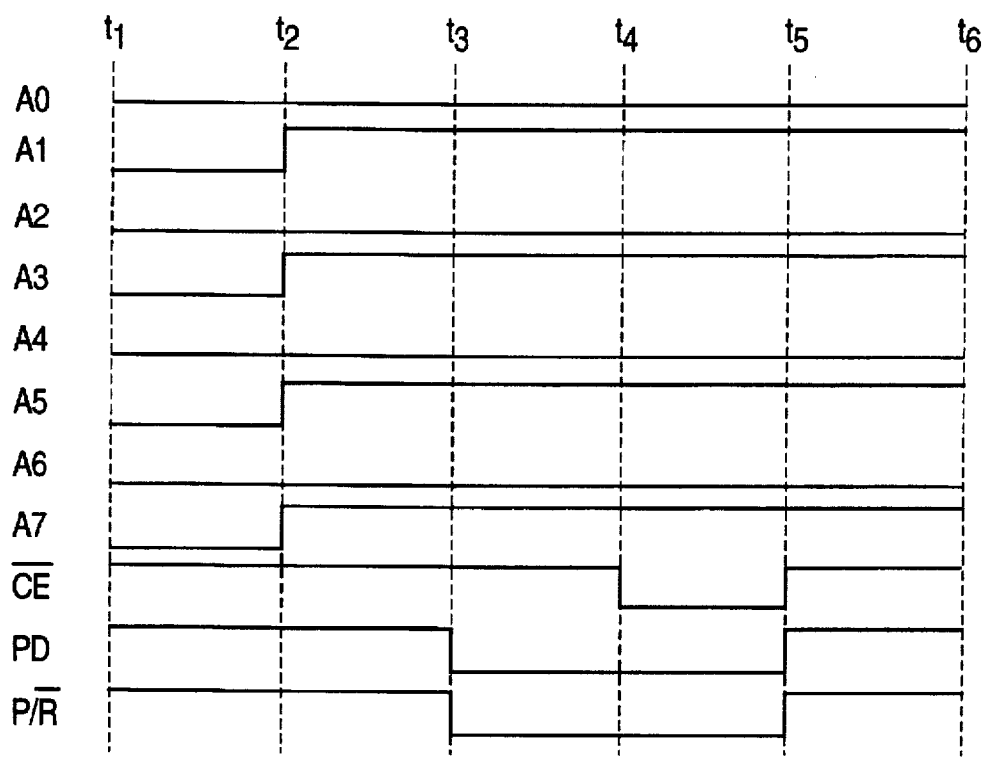
FIG. 11 is a timing diagram illustrating events vs. time for the flowchart in FIG. 7.

FIG. 11 illustrates the timing of the signals output from 8-bit registers 6U4 and 6U5 which drive input pins of sound integrated circuit 6U6. Time t1 represents the initial state after power has been applied. At time t2 the address is loaded. At time t3, the record and power-up commands are loaded. At time t4, the chip enable command is loaded and recording begins. Recording continues until time t5 when the disable and power-down commands are loaded.

Figure 12:
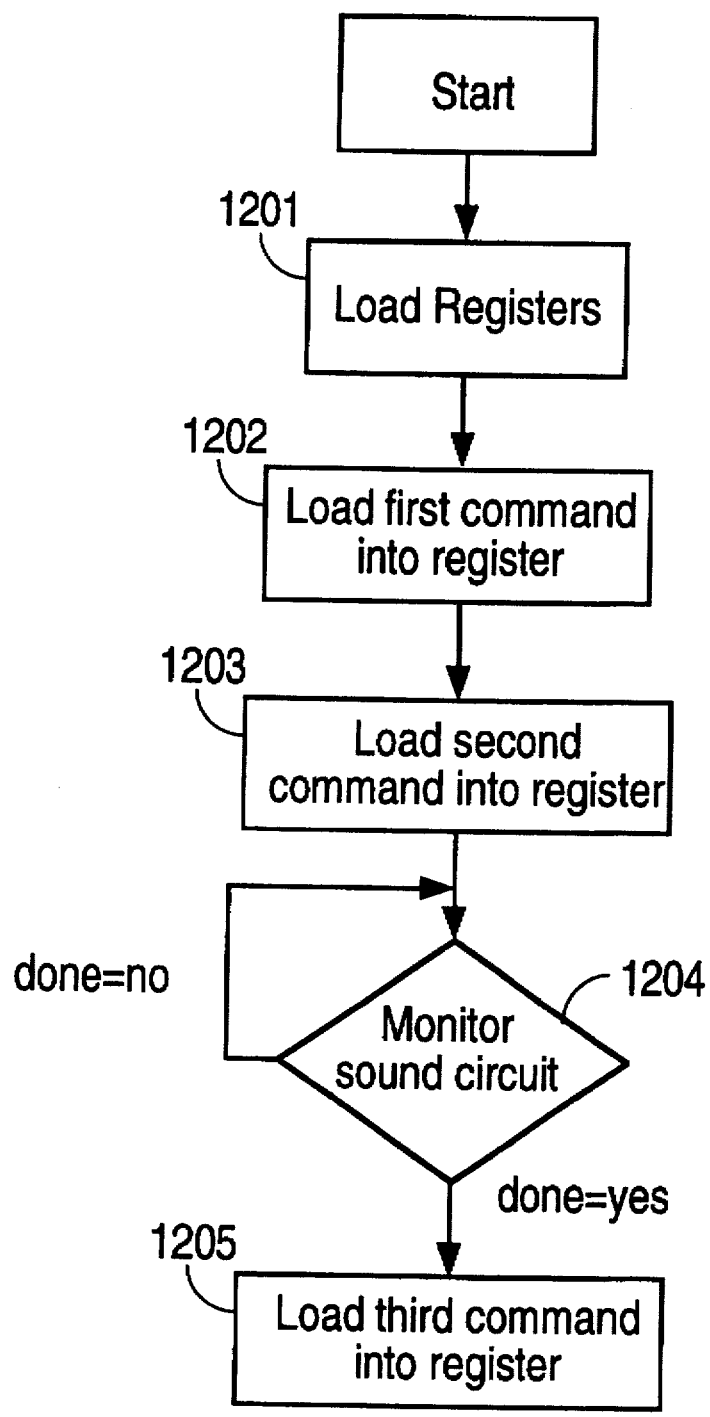
FIG. 12 is a flow chart illustrating the steps in a program that is executed by the CPU in the portable data collection terminal to play a voice prompt.

After the desired messages have been stored in sound integrated circuits 6U6 and 6U10, the messages can be played back in any order. FIG. 12 illustrates the flow of commands issued by CPU 414 to voice prompt circuit 408 to playback a message stored in sound integrated circuits 6U6 and 6U10. To playback a stored message, CPU 414, in load registers step 1201, loads the starting address of the message into registers 6U4 and 6U5 (FIG. 6). FIG. 8, as described above, is a timing diagram for loading 8-bit registers 6U4 and 6U5 with address AAH for sound integrated circuits 6U6 and 6U10.

Figure 13:
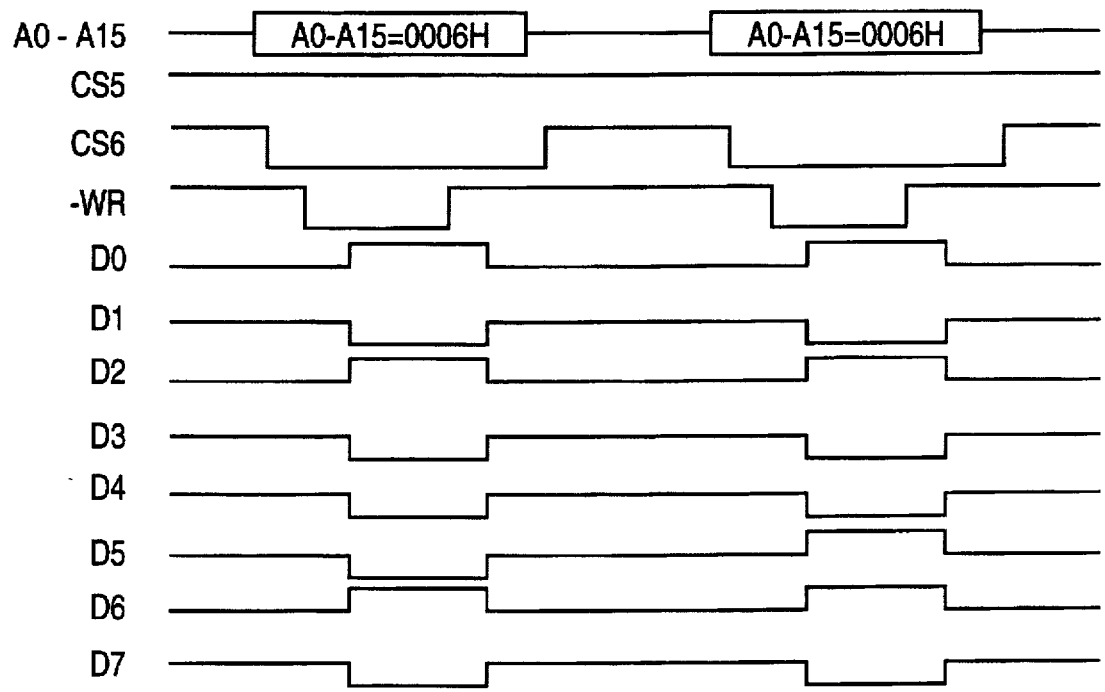
FIG. 13 is a timing diagram illustrating events vs. time for a control sequence in the flowchart in FIG. 12.

Next, in a first load command step 1202, the power-up command and the play command are loaded into register 6U4. After the power-up and play commands are loaded, the integrated circuit is enabled in a second load command step 1203 where the chip enable command is loaded. FIG. 13 is a timing diagram for loading 8-bit register 6U4 with the power-up command followed by the chip enable command in play mode for sound integrated circuit 6U6.

Figure 14:
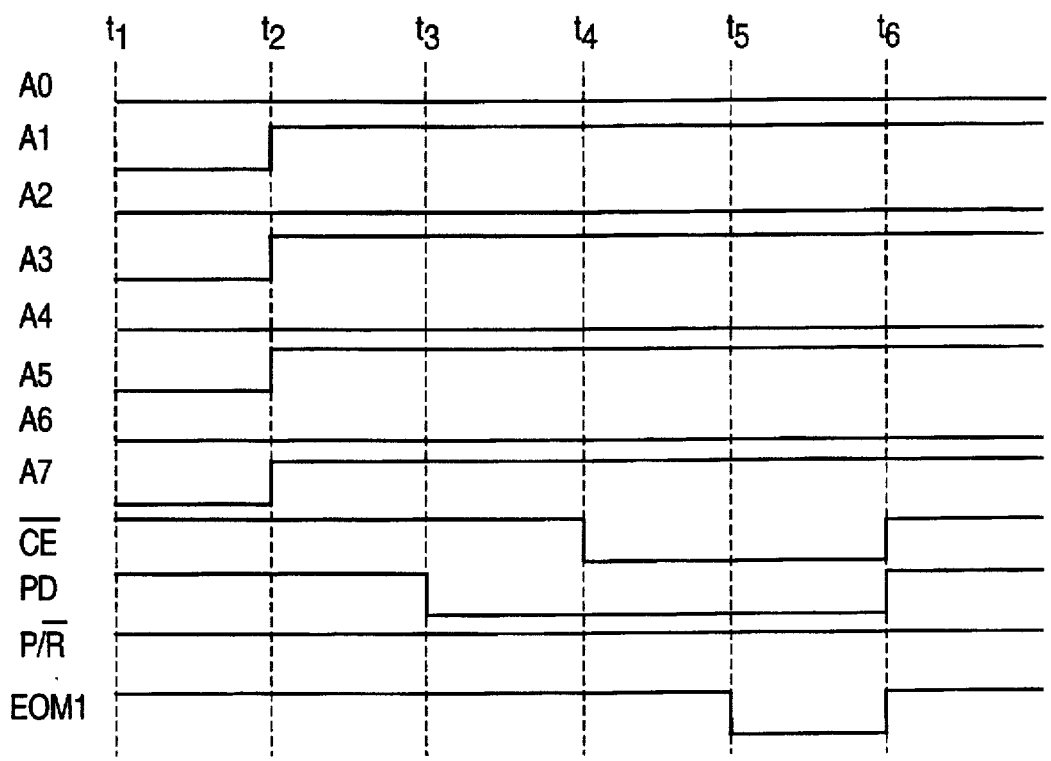
FIG. 14 is a timing diagram illustrating events vs. time for the flowchart in FIG. 12.

The timing sequence in FIG. 13 is similar to that described above for FIG. 8, 9 and 10. FIG. 14 illustrates the timing of the output signals from 8-bit registers 6U4 and 6U5 which drive input pins of sound integrated circuit 6U6. Time t1 represents the initial state after power has been applied. At time t2, the address is loaded. At time t3, the play and power-up commands are loaded. At time t4, the enable command is loaded and playback begins. Playback continues, in monitor sound circuit step 1204, until the selected message has finished playing at time t5. CPU 414 monitors the level of signal EOM1 by repeatedly driving line RIB low and reading the level of data line D0. Sound integrated circuit 6U6 drives signal EOM1 low when playback is complete. At time t6, the disable and power-down commands are loaded in a third load command step 1205, as illustrated in FIG. 12.

During playback in step 1204, the recorded analog voltages are sequentially read from the analog storage array under control of the same sample clock used for recording, thereby reconstructing the sampled waveform. A smoothing filter on the output signal from the analog storage array removes the sampling frequency component and the original waveform is restored. The output signal of the smoothing filter is passed through an analog multiplexer into an output power amplifier and provided at output pins SP+ and SP− of sound integrated circuit 6U6 as differential signals exactly 180 degrees out of phase. The output pin SP+ of sound integrated circuit 6U10 is connected to input pin AUXIN of sound integrated circuit 6U6. This allows slave sound integrated circuit 6U10 to playback messages through the master sound integrated circuit 6U6 since pin AUXIN is connected to the power amplifier when the master sound integrated circuit 6U6 is in the play mode and no message is being played.

Since the output power of the master sound integrated circuit 6U6 at pins SP+ and SP− can only drive 50 milliwatts, an external audio amplifier 6U7 is connected to output pin SP+ of sound integrated circuit 6U6. External audio amplifier 6U7 directly drives a 16 ohm speaker with up to 250 milliwatts of power with low distortion. Preferably audio amplifier 6U7 has the characteristics given in Table 3.

TABLE 3

| Characteristics of Audio Amplifier 6U7 |
| --- |
| Single 5V supply operation |
| Standby function with current consumption less than 100 μA |
| Direct speaker drive |
| Low distortion |

One amplifier integrated circuit suitable for use in amplifier circuit 507 is sold by Motorola Semiconductor of Phoenix, Ariz. under model number MC34119. Resistors 6R16, 6R20 and 6R21 set the volume level and capacitor 6C5 is used as a high pass filter. Capacitor 6C5, and resistors 6R16 and 6R20 are connected in series between output pin SP+ of sound integrated circuit 6U6 and the input to audio amplifier 6U7. Capacitor 6C8 provides power supply noise rejection for audio amplifier 6U7.

Enunciator 308 is directly connected to amplifier 6U7 and is preferably of the flat type to minimize size and weight. In one embodiment, enunciator 308 has the characteristics given in Table 4.

TABLE 4

| Characteristics of Enunciator 308 |
| --- |
| 40 mm diameter round |
| Samarium cobalt magnet |
| Mylar cone |
| 16 ohm impedance |
| Sound pressure level of 92 dB/W |
| Frequency response of 500–8000 Hz |

One speaker suitable for use as enunciator 308 in voice prompt circuit 208 is manufactured by Shogyo international Corp. of Great Neck, N.Y. under model number GC0402ML.

Voice recognition circuit 420 can recognize any word or phrase that has been processed by voice recognition circuit 420 and stored in a memory of voice recognition circuit 420. The sequence of processing and storing these words or phrases is called "training". Training includes speaking the word or phrase to be recognized into microphone 307 one or more times, typically twice, and then assigning a key, a command, a sequence of keys, or commands to the spoken word or phrase. These keys or commands are stored along with the trained word or phrase. Later, during voice recognition, when a word or phrase is recognized by voice recognition circuit 420, the stored key or command is recalled and executed. This sequence is repeated for every word or phrase that is subsequently recognized by voice recognition circuit 420. Voice recognition circuit 420, in one embodiment, can recognize up to 30 words or phrases of up to two seconds in length each.

This type of voice recognition requires training, and so is called "speaker-dependent". Thus, voice recognition circuit 420 reliably recognizes only the voice of the person who trained circuit 420. To overcome this limitation, multiple users may train their vocabularies into multiple "banks" of memory. When a user wishes to use the voice recognition feature of portable data collection terminal 300, the user simply selects the appropriate stored vocabulary. Larger vocabularies and speaker independent voice recognition systems are currently available, but are too large or draw too much power for practical use in portable data collection terminal 300 at this time.

Figure 15:
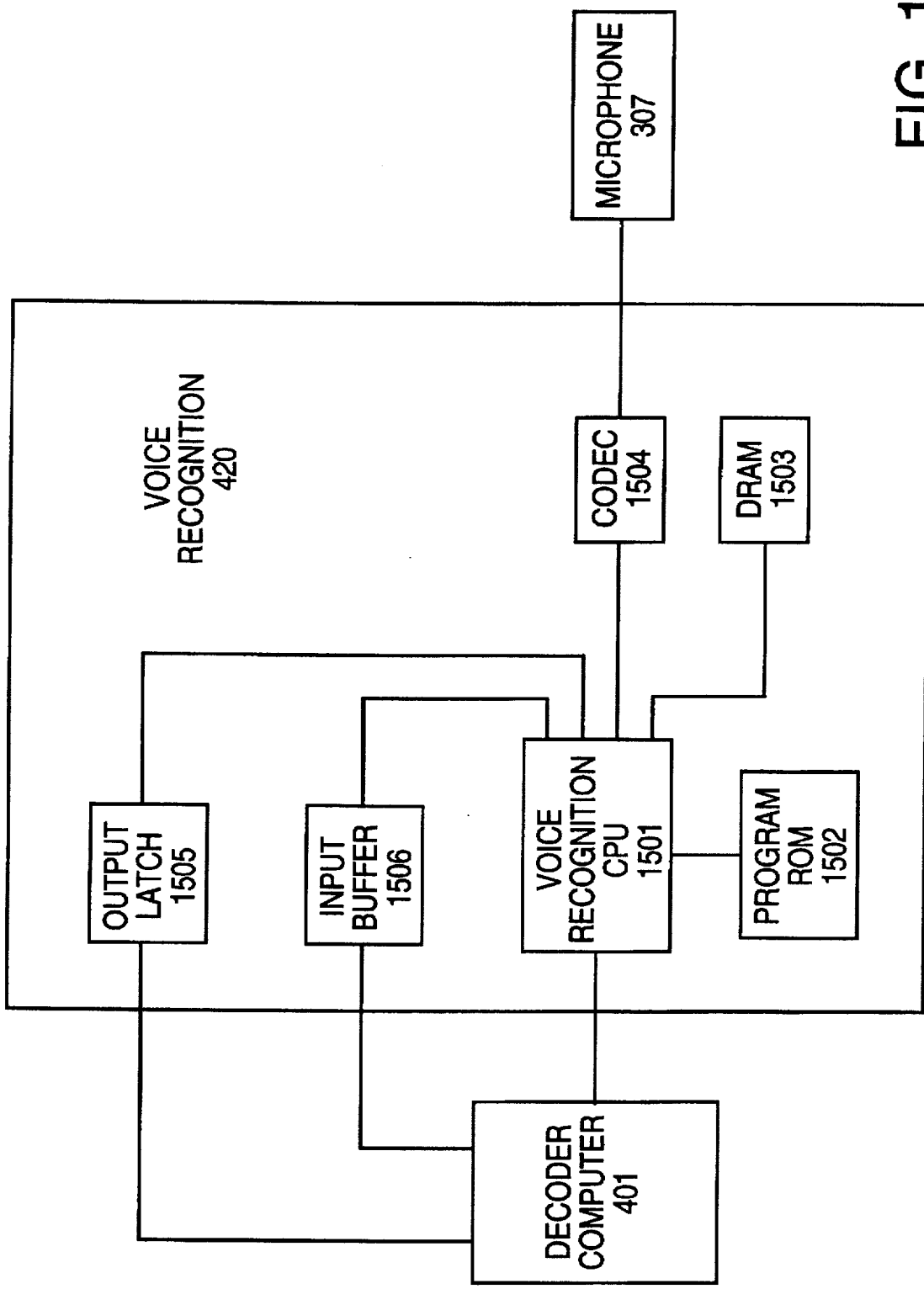
FIG. 15 is a block diagram of the voice recognition circuit in one embodiment of the portable data collection terminal of this invention.

FIG. 15 is a more detailed block diagram of one embodiment of voice recognition circuit 420. In this embodiment, voice recognition central processing unit (VR-CPU) 1501 communicates with decoder computer 401 through output port 1505, that in this embodiment is an 8-bit output latch, and an input port 1506, that in this embodiment is an 8-bit input latch. Input and output ports 1505 and 1506 allow VR-CPU 1501 to exchange commands and data with decoder computer 401. Nonvolatile read-only-memory (ROM) 1502 stores the voice recognition programs that are executed by VR-CPU 1501. The digitized voice patterns that result from training are stored in dynamic random access memory (DRAM) 1503 that is referred to as template DRAM 1503, as explained more completely below. The storage capacity of template DRAM 1503 determines the total number of words that can be trained and recognized.

Preferably, VR-CPU 1501 has characteristics similar to those given in Table 5.

TABLE 5

| Characteristics of VR-CPU 1501 |
| --- |
| DSP Module for high-speed DSP operations. |
| 2.1 Kbyte internal RAM. |
| 25 Kbyte internal ROM. |
| Interrupt controller. |
| DRAM controller. |
| CODEC clock generation and interface. |
| Power down mode. |

One VR-CPU 1501 suitable for use in voice recognition circuit 420 of portable data collection terminal 300 is sold by National Semiconductor of Santa Clara, Calif. under model number NS32AM162.

Voice band coder/decoder (CODEC) 1504 functions as an analog-to-digital (A/D) and digital-to-analog (D/A) converter that receives an analog input signal from microphone 307 and generates a digital output signal to VR-CPU 1501 for voice input, and that converts a digital input signal from VR-CPU 1501 to an analog output signal to amplifier 507 or earphone 508 for voice output.

Electret condenser microphone 307 is attached to CODEC 1504 by a microphone input circuit that includes a bias network. Microphone 307 converts audio frequency waves into electrical signals which are further low pass filtered and digitized by CODEC 1504. Preferably, CODEC 1504 has the characteristics given in Table 6.

TABLE 6

Characteristics of CODEC 1504

Single 5V power supply
Running power dissipation of 23 mW
Power down power dissipation of 0.01 mW
On chip transmit band-pass filter
On chip receive low-pass filter
Mu-Law and A-Law companding One CODEC 1504 suitable for use in voice recognition circuit 420 of portable data collection terminal 300 is sold by Motorola Semiconductor of Phoenix, Ariz. under model number MC145480.

In communication between decoder computer 401 and VR-CPU 1501, input port 1506 is used to store commands and data sent from decoder computer 401 to VR-CPU 1501. Similarly, output port 1505 is used to store data sent from VR-CPU 1501 to decoder computer 401. A "handshaking" protocol, as described below, is used to transfer bytes of information between decoder computer 401 and VR-CPU 1501 through input port 1506 and output port 1505.

Initially, a computer program executing in decoder computer 401 instructs decoder computer 401 to initiate a communication sequence with VR-CPU 1501. Typically, a communication sequence includes transmission of a command followed by transmission of one of more additional pieces of information, as described more completely below. Hence, decoder computer 401 enters start sequence 1601 and transitions to transmit state 1602.

In transmit state 1602, decoder computer 401 writes a command byte or a data byte into input port 1506. Upon completion of the write, decoder computer 401 transitions to set interrupt state 1603.

In set interrupt state 1603, decoder computer 401 drives an interrupt signal active to signal that a byte has been written into input buffer 1506. In this embodiment, decoder computer 401 drives a low signal on a IRQ3 line to VR-CPU 1501. After setting the interrupt, decoder computer 401 transitions to an idle state 1604. In idle state 1604, decoder computer 401 periodically polls the state of an acknowledge signal on an acknowledge line ACK from VR-CPU 1501. In idle state 1604, decoder computer 401 can perform other operations for portable data collection terminal 300. However, with respect to the voice recognition process, decoder computer 401 is performing no operations and so is considered idle.

Typically, VR-CPU 1501 is in a sleep state 1650 to reduce current consumption. However, upon receipt of an active signal on IRQ3 line, VR-CPU 1501 wakes up and transitions to clear port state 1651.

In clear port state 1651, VR-CPU 1501 clears any message or data byte that is left over from the previous byte transfer. Specifically, VR-CPU 1501 clears output port 1505 by writing 00h to output port 1505, and transitions to read input state 1652.

In read input state 1652, VR-CPU 1501 reads the byte stored in input port 1506, and transitions to valid state 1653 where VR-CPU 1501 checks the byte to verify that the byte is a valid command or data byte. The first byte transmitted from decoder computer 401 to VR-CPU 1501 is always a command. Some commands are followed by either parameter or data bytes. The following are valid commands: TRAIN, VERIFY, RECOGNIZE, CLEAR VOCABULARY, DELETE, SET PARAMETER, READ PARAMETER, SAVE TEMPLATE, LOAD TEMPLATE. Thus, in valid state 1653, VR-CPU 1501 makes a check that is appropriate for the current status of the voice recognition process. If the read byte is valid, processing transitions to sequence complete state 1654 and otherwise to write error state 1655.

In write error state 1655, VR-CPU 1501 writes an error byte to output port 1505 for the particular type of error detected in valid state 1653. Specific error codes are listed below for each of the commands. After the error byte is written, VR-CPU 1501 transitions to acknowledge state 1657.

In sequence complete state 1654, if the byte read is the last byte of a command sequence, VR-CPU 1501 transitions to write status state 1656 and otherwise passes directly to acknowledge state 1658. In write status state 1656, VR-CPU 1501 loads a command complete code, e.g., an OK code, into output port 1505 to signal the end of a command sequence and transitions to acknowledge state.

In acknowledge state 1657 and acknowledge state 1658, VR-CPU 1501 drive an acknowledge signal active, e.g., low, to decoder computer 401 for a time period long enough for decoder computer 401 to detect the active acknowledge signal. After the predetermined period, VR-CPU 1501 drives the acknowledge signal inactive and transitions to an idle state.

Specifically, VR-CPU 1501 transitions from acknowledge state 1657 to idle state 1660. If after a predetermined time, VR-CPU 1501 does not receive further communication from decoder computer 401, VR-CPU 1501 transitions from idle state 1660 to sleep state 1650.

VR-CPU 1501 transitions from acknowledge state 1658 to complete command state 1659. VR-CPU 1501 in complete command state 1659 performs the operations that are described more completely below for each of the commands. Upon completion of the command, VR-CPU 1501 transitions to idle state 1660.

As described above in idle state 1604, decoder computer 401 polls the status of the acknowledge signal from VR-CPU 1501. When the acknowledge signal goes active, decoder computer 401 transitions from idle state 1604 to read state 1605 and clears the active signal on line IRQ3 to VR-CPU 1501.

In read state 1605, decoder computer 401 reads output port 1505 and transitions to error state 1606. In error state 1606, decoder computer 401 determines if the information in output port 1505 is an error code. If an error code is detected processing transfers to error handler state 1607.

In error handler state 1607, decoder computer 401 can retry the command, display an error message on display 303, play a voice prompt to alert the user of the problem, or perform any combination of the three operations. If output port 1505 is clear, i.e, contains the value 00h, no error has occurred and processing transfers through error state 1606 to command complete sequence state 1608.

If the command sequence is complete, decoder computer 401 goes to end state 1609 and otherwise transitions to transmit state 1602 and continues with transmission of another byte associated with the command.

Figure 16:
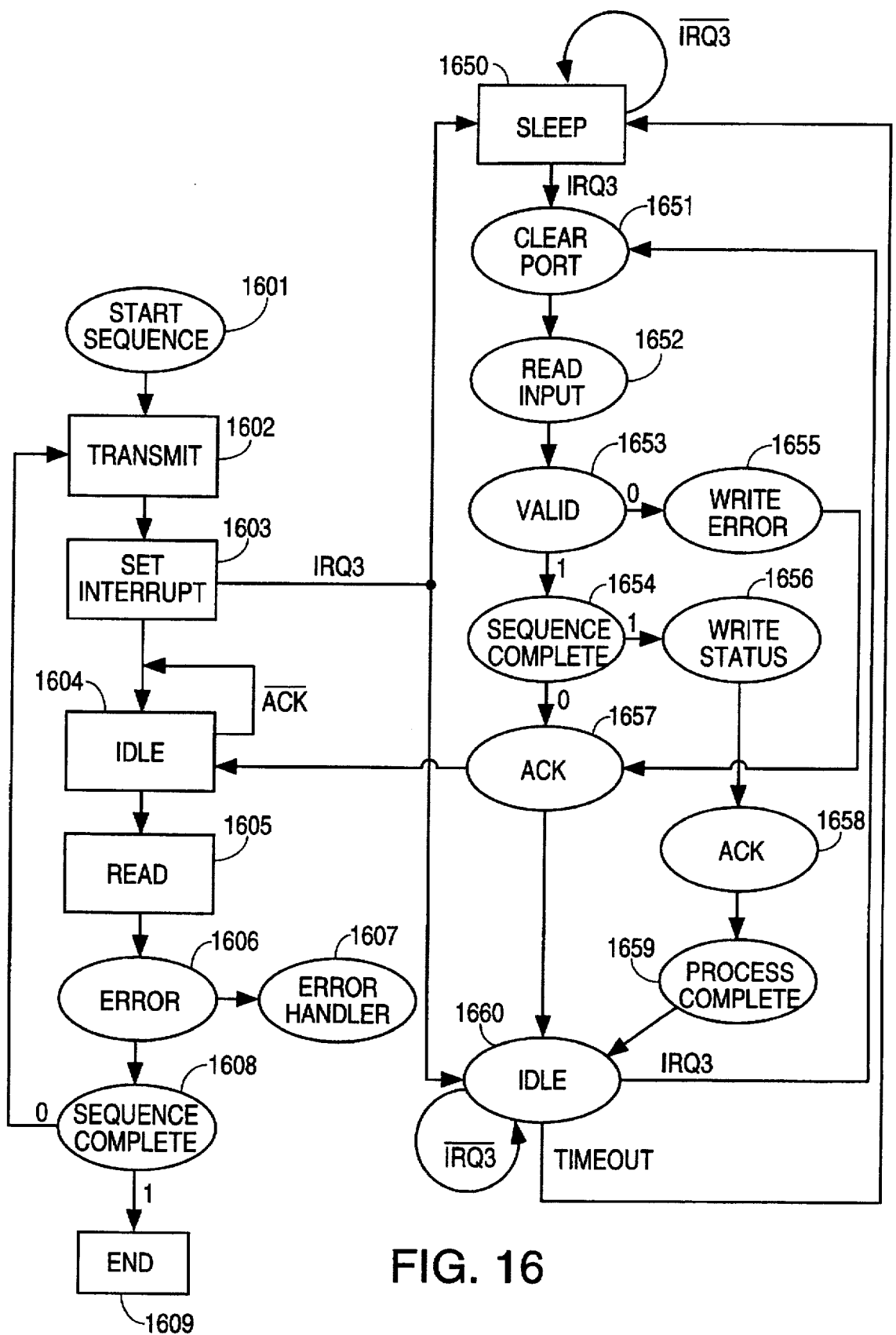
FIG. 16 is a flow chart illustrating the steps in a program that is executed by the decode CPU and the voice recognition CPU in the portable data collection terminal to command the voice recognition circuit.

The sequence of operations illustrated in FIG. 16 is performed for each byte loaded into input port 1506 and so the entire sequence of operations is not repeated explicitly below in the description of the various commands and bytes loaded into input port 1506.

When first powered-up, VR-CPU 1501 is initialized by decoder computer 401 by decoder computer 401 setting various parameters used by VR-CPU 1501. Specifically, decoder computer 401 first transmits to VR-CPU 1501 a command SET PARAMETER followed by a PARAMETER TYPE byte which in turn is followed by a PARAMETER VALUE byte using the protocol previously discussed. The sequence of command, parameter type, and parameter value is transmitted for each parameter that is initialized. Possible error codes that may occur during the SET PARAMETER command sequence are: VALUE OUT OF RANGE and INVALID PARAMETER TYPE. Valid parameter types are given in Table 7.

TABLE 7

VR-CPU 1501 Parameters

| Parameter Type | Definition |
| --- | --- |
| capture time | Maximum length of time VR-CPU 1501 waits for an utterance, typically, 10 seconds. |
| match acceptance threshold | A level that defines how closely a stored utterance and a spoken utterance must match for VR-CPU 1501 to declare a match between the two. |
| input speech energy threshold | The minimum acceptable level for an utterance before the utterance is considered too soft. |
| collision distance threshold | How similar two utterances for different words can be during the training or verification process before a collision error is generated. |
| verify acceptance threshold | A level that defines how different two utterances for the same word can be during a verification process before a verification error is generated. |
| number of words trained | The current number of words that have been trained. (read only) |

The values of the above parameters may be read back by decoder computer 401 by sending a command READ PARAMETER to VR-CPU 1501.

Since template DRAM 1503 is volatile in this embodiment, all voice templates generated through training are lost when power is turned off. Thus, at power on, template DRAM 1503 is empty and subsequently is loaded either from a template stored in programmable non-volatile memory 415, or programmed through training by the user. In this embodiment, allowing 2 seconds per utterance, each utterance requires one Kbyte of memory for the two templates, i.e., the original template and a verification template, in template DRAM 1503 that are associated with that utterance. Preferably template DRAM 1503 has the characteristics given in Table 8.

TABLE 8

| Characteristics of Template DRAM 1503 |
| --- |
| 262, 144 × 4 bit organization |
| Single 5V power supply |
| Operating power of under 500 mW |
| Standby power of under 2 mW |
| SOJ package |

One DRAM integrated circuit suitable for use in voice recognition circuit 420 as template DRAM 1503 is sold by Toshiba America Electronic Components of Irvine, Calif. under model number TC514256.

To train voice recognition circuit 420, the user selects command TRAIN; word number (WORD#) to be trained; and the command or key(s) to be associated with this word number WORD# by pressing keys on keypad 302 or scanning bar code 306 with bar code scanner 304. Decoder computer 401 sequentially transmits a command TRAIN, a word number WORD#, and the data representing the command or keys associated with word number WORD# to VR-CPU 1501 using the protocol previously discussed.

Once command TRAIN, word number WORD#, and the data byte have been decoded and validated by VR-CPU 1501, status byte BUSY is written to output latch 1505 by VR-CPU 1501 to inform decoder computer 401 that VR-CPU 1501 is busy. VR-CPU 1501 then enables CODEC 1504 and, using a simple serial interface, clocks in data from CODEC 1504. VR-CPU 1501 analyzes the data from CODEC 1504 and when the amplitude of the data is greater then parameter INPUT SPEECH ENERGY THRESHOLD, voice data is captured and stored. When the input speech energy is low for a sufficient period of time to indicate the end of a word or phrase, VR-CPU 1501 stops clocking in data and disables CODEC 1504.

The captured utterance is first converted into a template representative of the utterance. The template is checked for collision with all previously trained templates by VR-CPU 1501. If a collision is not detected, the template is stored in template DRAM 1503. After the template is stored, VR-CPU 1501 loads status byte OK into output port 1505 to inform decoder computer 401 that the utterance was successfully trained.

During training of voice recognition circuit 420, one of four possible errors may occur. First, error NO UTTERANCE DETECTED occurs if the data input from CODEC 1504 does not exceed parameter INPUT SPEECH ENERGY THRESHOLD during the capture time allowed for training. This error could be caused by the user speaking too softly or too far away from microphone 307. A second error UTTERANCE TOO LONG occurs if the utterance is greater than 2 seconds in length. A third error UTTERANCE TOO LOUD occurs when the user speaks too loud or too close to microphone 307. This saturates the input to CODEC 1504 causing distortion of the input signal. A fourth error TEMPLATE COLLISION occurs when the utterance does not exceed parameter COLLISION DISTANCE THRESHOLD. This is the result when a new word is trained that sounds similar to a previously trained word.

For improved voice recognition accuracy, all trained words preferably are followed by a verification. This procedure simply calls for the user to repeat the utterance used in the training process. Typically, the user is first prompted to speak the utterance for the training process and after the trained word passes error checking, the user is prompted to repeat the utterance for a verification.

Verification mode typically immediately follows the training process to obtain a second template for the previously trained word. To enter this mode, decoder computer 401 first transmits command VERIFY followed by a word number WORD# to VR-CPU 1501 using the protocol previously discussed.

Once command VERIFY and word number WORD# have been decoded and validated by VR-CPU 1501, status byte BUSY is written to output port 1505 by VR-CPU 1501 to inform decoder computer 401 that VR-CPU 1501 is busy. VR-CPU 1501 then enables CODEC 1504 and clocks in data from CODEC 1504.

VR-CPU 1501 analyzes the data from CODEC 1504, and when the amplitude of the data is greater than parameter INPUT SPEECH ENERGY THRESHOLD, voice data is captured and stored. When the input speech energy is low for a sufficient period of time to indicate the end of a word or phrase, VR-CPU 1501 stops clocking in data and disables CODEC 1504.

VR-CPU 1501 converts the captured verify utterance into a template representative of the utterance and compares the verify template with the previously trained template having the same word number WORD#. If the comparison exceeds parameter VERIFY ACCEPTANCE THRESHOLD, the verify template is then checked for collision with all previously trained templates by VR-CPU 1501 and then stored in template DRAM 1503 if a collision is not detected. After the verification template is stored, VR-CPU 1501 loads message OK into output port 1505 to inform decoder computer 401 that the utterance was successfully verified.

During the verification of an utterance by voice recognition circuit 420, one of five possible errors may occur. The first four errors are the same as those described above with respect to training. A fifth error TEMPLATE NOT VERIFIED occurs when the verify utterance does not exceed the VERIFY ACCEPTANCE THRESHOLD when compared to the previously trained utterance with the same word number WORD#.

Words that have been previously trained can be deleted from template DRAM 1503. To delete a template that has been stored in template DRAM 1503, the user selects command DELETE and the word number WORD# of the template to be deleted by pressing keys on keypad 302 or scanning bar code 306 with bar code scanner 304. In response to the user input, decoder computer 401 sequentially transmits command DELETE followed by the word number WORD# using the protocol previously discussed.

In response to receiving command DELETE and word number WORD#, VR-CPU 1501 first verifies that a template having word number WORD# exists, and then clears the template having word number WORD# in template DRAM 1503. After the template is deleted, VR-CPU 1501 loads status message OK into output port 1505 to inform decoder computer 401 that the template was successfully deleted. If the template to be deleted has not been previously trained or loaded, VR-CPU 1501 loads error WORD# DOES NOT EXIST into output port 1505 to inform decoder computer 401 that the template having the specified word number WORD# does not exist.

To clear all templates stored in template DRAM 1503, the user selects command CLEAR ALL TEMPLATES by pressing keys on keypad 302 or scanning bar code 306 with bar code scanner 304. In response to the user input, decoder computer 401 transmits a command CLEAR VOCABULARY to VR-CPU 1501 using the protocol previously discussed.

In response to command CLEAR VOCABULARY, VR-CPU 1501 clears all template locations in template DRAM 1503 and then loads a status message OK into output port 1505 to inform decoder computer 401 that all templates have been cleared. There are no error messages for command CLEAR VOCABULARY.

Once training is complete, the data stored in template DRAM 1503 can be transferred to programmable non-volatile memory 415 using command SAVE VOCABULARY. Furthermore, template data that has been previously transferred to programmable non-volatile memory 415 can be transferred back into template DRAM 1503 using command LOAD VOCABULARY.

To save a vocabulary from template DRAM 1503 into programmable non-volatile memory 415, the user selects command SAVE VOCABULARY and enters a number of the vocabulary to be saved by pressing keys on keypad 302 or scanning bar code 306 with bar code scanner 304. In response to the user input, decoder computer 401 transmits to VR-CPU 1501, using the protocol previously discussed, command SAVE TEMPLATE followed by a word number WORD# for the first template to be transferred from template DRAM 1503 to programmable non-volatile memory 415.

In response to command SAVE TEMPLATE and word number WORD#, VR-CPU 1501 verifies that a template for word number WORD# exists, and then load the length (in bits) of the first template of the template for word number WORD# into output port 1505 followed by a stream of data bytes representing the first template of the template for word number WORD#. All bytes are transferred using the protocol previously discussed.

VR-CPU 1501 waits to receive a status message CONTINUE from decoder computer 401 before transmitting the second template of the template for word number WORD#. After decoder computer 401 has completed storing the first template of the template for word number WORD# in programmable non-volatile memory 415, decoder computer loads a status message CONTINUE into input port 1505 to notify VR-CPU 1501 that it is ready to receive the second template of the template for word number WORD#.

When VR-CPU 1501 receives status message CONTINUE, VR-CPU 1501 loads the length (in bits) of the second template of the template for word number WORD# into output port 1505 followed by a stream of data bytes representing the second template of the template for word number WORD#. All bytes are transferred using the protocol previously discussed.

This procedure is repeated, changing word number WORD# each time, until all templates have been transferred from template DRAM 1503 to programmable non-volatile memory 415. If the template to be transferred has not been previously trained or loaded, VR-CPU 1501 loads error WORD# DOES NOT EXIST into output port 1505 to inform decoder computer 401 that the specified word number WORD# does not exist.

To load a vocabulary from programmable nonvolatile memory 415 into template DRAM 1503, the user selects command LOAD VOCABULARY and enters a number of the vocabulary to be loaded by pressing keys on keypad 302 or scanning bar code 306 with bar code scanner 304. In response to the user input, decoder computer 401 first transmits a command LOAD TEMPLATE command followed by a word number WORD# and then a TEMPLATE LENGTH data byte for the first template to be transferred from programmable non-volatile memory 415 into template DRAM 1503 to VR-CPU 1501 using the protocol previously discussed. Next, decoder computer 401 reads the template data for the template for word number WORD# from programmable non-volatile memory 415 and transmits the template data to VR-CPU 1501 a byte at time using the protocol previously discussed. VR-CPU 1501 stores the template data in template DRAM 1503. If the total number of bytes transferred is equal to the TEMPLATE LENGTH data byte, VR-CPU 1501 loads status message OK into output port 1505. If less bytes are transferred than the TEMPLATE LENGTH data byte, VR-CPU 1501 loads error DATA TRANSFER TIMEOUT into output port 1505. If more bytes are transferred than the TEMPLATE LENGTH data byte, VR-CPU 1501 loads error TOO MANY DATA BYTES SENT into output port 1505. The above procedure is repeated, changing word number WORD# each time, until all templates have been transferred from programmable non-volatile memory 415 to template DRAM 1503.

Commands SAVE VOCABULARY and LOAD VOCABULARY provide a means to back-up the volatile template data stored in template DRAM 1503 in a nonvolatile memory and load data in volatile template data. Template data may also be down-loaded from a PC attached to I/O interface 409. A non-volatile memory that can store multiple copies of template DRAM 1503 allows multiple users to each train voice recognition circuit 420 and then save their template data into non-volatile memory 415. This allows multiple users to use portable data collection terminal 300 with voice recognition circuit 420 without retraining each time the power is turned off.

Once the training and verification process is complete all trained and verified words can be recognized by voice recognition circuit 420. Voice recognition mode is typically initiated by decoder computer 401 immediately following the playing of a voice prompt message. To enable voice recognition, decoder computer 401 transmits a command RECOGNIZE to VR-CPU 1501 using the protocol previously discussed.

Once command RECOGNIZE has been decoded and validated by VR-CPU 1501, status byte BUSY is written to output port 1505 by VR-CPU 1501 to inform decoder computer 401 that VR-CPU 1501 is busy. VR-CPU 1501 enables CODEC 1504 and, using a simple serial interface, clocks in data from CODEC 1504. VR-CPU 1501 analyzes the data from CODEC 1504 and when the amplitude of the data is greater than parameter INPUT SPEECH ENERGY THRESHOLD, voice data is captured and stored. When the input speech energy is low for a sufficient period of time to indicate the end of a word or phrase, VR-CPU 1501 stops clocking in data and disables CODEC 1504.

The captured utterance is first converted into a template representative of the utterance and then compared against all previously trained templates stored in template DRAM 1503. If the closest matching template is within parameter MATCH ACCEPTANCE THRESHOLD, VR-CPU 1501 first loads status message OK followed by word number WORD# of the closest matching template into output port 1505.

During voice recognition, one of four possible errors may occur. First, error NO UTTERANCE DETECTED occurs if the data input from CODEC 1504 does not exceed the parameter INPUT SPEECH ENERGY THRESHOLD parameter during the allowed capture time. This error could be caused by the user speaking too softly or being too far away from microphone 307. A second error UTTERANCE TOO LONG occurs if the utterance is greater than 2 seconds in length. A third error UTTERANCE TOO LOUD occurs when the user speaks too loud or is too close to microphone 307. This saturates the input to CODEC 1504 causing distortion of the input signal. A fourth error NO MATCHING TEMPLATE occurs when the utterance does not compare with any template stored in template DRAM 1503 within parameter MATCH ACCEPTANCE THRESHOLD.

The programs and algorithms used by VR-CPU 1501 are contained in non-volatile memory 1502. This memory may be internal to VR-CPU 1501 or external to VR-CPU 1501. Preferably, the voice recognition process and control sequences programmed into non-volatile memory 1502 have characteristics similar to those given in Table 9.

TABLE 9

Characteristics of Voice Recognition Process

Speaker-dependent
Recognition accuracy of 95% or greater
1024 bytes/word template size
6 kBytes code size
National Semiconductor NS32AM162 compatible One set of voice recognition software and control sequences programmed into non-volatile memory 1502 suitable for use in voice recognition circuit 420 of portable data collection terminal 300 is sold by Vocal Inc., of Palo Alto, Calif. under model name "TrueWord Voice Recognition Technology".

The embodiments of this invention, as described above, are illustrative only of the principles of this invention and are not intended to limit the invention to the embodiments described. In view of this disclosure, those skilled in the art will be able to utilize the voice prompt system as well as individual circuits in the voice prompt system in a wide variety of applications.

We claim:

1. A portable data collection terminal comprising:

a data input means;

a decoder computer connected to said data input means wherein in response to a signal from said data input means, said decoder computer generates a voice prompt signal and further wherein said decoder computer generates voice recognition commands;

a voice prompt circuit connected to said decoder computer so as to receive said voice prompt signal
      wherein in response to said voice prompt signal, said voice prompt circuit generates an oral voice prompt for an operator of said data collection terminal; and further wherein
      said voice prompt circuit further comprises a recording circuit wherein in response to an audio frequency signal, said recording circuit processes said audio frequency signal for storing in said voice prompt circuit; and a voice recognition circuit connected to said decoder computer so as to receive said voice recognition command.

2. The portable data collection terminal of claim 1 wherein said voice prompt circuit further comprises a memory coupled to said recording circuit wherein said voice prompt stores said processed audio frequency signal from said recording circuit in said memory.

3. The portable data collection terminal according to claim 2 wherein said memory is non-volatile memory.

4. The portable data collection terminal of claim 3 wherein said non-volatile memory is an EEPROM memory.

5. The portable data collection terminal of claim 1 further comprising:

a built-in microphone coupled to said voice prompt circuit and to said voice recognition circuit wherein said built-in microphone generates a signal that is a source of said audio frequency signal.

6. The portable data collection terminal of claim 1 further comprising:

a microphone connection coupled to said voice prompt circuit and said voice recognition circuit wherein upon connecting an external microphone to said microphone connection, said microphone is a source of said audio frequency signal.

7. The portable data collection terminal of claim 1 wherein said voice prompt circuit further comprises a speaker wherein said speaker generates said oral voice prompts in response to signals generated by said voice prompt circuit.

8. The portable data collection terminal of claim 1 wherein said voice recognition circuit further comprises a voice recognition processor coupled to said decoder computer.

9. The portable data collection terminal of claim 8 wherein said voice recognition circuit further comprises a programmable read-only memory.

10. The portable data collection terminal of claim 8 wherein said voice recognition circuit further comprises a coder/decoder circuit coupled to said voice recognition processor.

11. The portable data collection terminal of claim 1 further comprising:

a display.

12. The portable data collection terminal of claim 1 wherein said data input means is a bar code scanner.

13. The portable data collection terminal of claim 12 wherein said bar code scanner is a hand held bar code scanner.

14. The portable data collection terminal of claim 13 wherein said hand held bar code scanner is a wireless hand held bar code scanner.

15. The portable data collection terminal of claim 13 wherein said hand held bar code scanner transmits data to said portable data collection terminal over a wire connecting said hand held bar code scanner to said portable data collection terminal.

16. The portable data collection terminal of claim 12 wherein said bar code scanner is integral to said portable data collection system.

17. The portable data collection terminal of claim 1 wherein said data input means comprises a keypad.

18. The portable data collection terminal of claim 1 wherein said data input means includes a keypad and a bar code scanner.

* * * * *